United States Patent
Kapadia et al.

(10) Patent No.: US 11,138,224 B2
(45) Date of Patent: Oct. 5, 2021

(54) INTELLIGENT CONFLICT DETECTION AND SEMANTIC EXPRESSION OF DOCUMENT EDITS

(71) Applicant: Microsoft Technology Licensing, LLC, Redmond, WA (US)

(72) Inventors: Arshish C. Kapadia, Issaquah, WA (US); Tarkan Sevilmis, Redmond, WA (US); Peter Adam Outcalt, Bellevue, WA (US); Marius Bunescu, Redmond, WA (US); Ryan Yandle, Seattle, WA (US)

(*) Notice: Subject to any disclaimer, the term of this patent is extended or adjusted under 35 U.S.C. 154(b) by 699 days.

(21) Appl. No.: 15/697,118

(22) Filed: Sep. 6, 2017

(65) Prior Publication Data

US 2017/0364573 A1 Dec. 21, 2017

Related U.S. Application Data

(63) Continuation of application No. 14/319,997, filed on Jun. 30, 2014, now Pat. No. 9,785,693.

(51) Int. Cl.
*G06F 16/27* (2019.01)
*G06F 16/20* (2019.01)
(Continued)

(52) U.S. Cl.
CPC .............. *G06F 16/27* (2019.01); *G06F 16/20* (2019.01); *G06F 16/93* (2019.01); *G06F 16/955* (2019.01);
(Continued)

(58) Field of Classification Search
CPC ........ G06F 16/27; G06F 16/93; G06F 16/955; G06F 16/20; G06F 40/166; G06F 40/197; G06F 40/174; G06Q 10/101
See application file for complete search history.

(56) References Cited

U.S. PATENT DOCUMENTS 6,067,551 A 5/2000 Brown et al.
6,240,414 B1 * 5/2001 Beizer ................ G06F 16/1787
(Continued)

OTHER PUBLICATIONS

"Office Action Issued in Chinese Patent Application No. 201580036035.3", dated Dec. 5, 2018, 18 Pages.
"Second Office Action Issued in Chinese Patent Application No. 201580036035.3", dated Jun. 24, 2019, 5 Pages.
"Non Final Office Action Issued in U.S. Appl. No. 14/319,997", dated Apr. 22, 2016, 11 Pages.
(Continued)

*Primary Examiner* — Pierre M Vital
*Assistant Examiner* — Andrew N Ho
(74) *Attorney, Agent, or Firm* — NovoTechIP International PLLC

(57) ABSTRACT

An intelligent conflict detection system. The system provides semantic expression of edits and history-aware conflict detection in a large-scale service allowing multiple users to simultaneously work with the same document, which may result in conflicting edits. When submitted, changes to a version of a document are compared to all versions of the document created since the document was sourced. Edits to documents are expressed as intents describing the changes in terms of an action and object of that action based on a characteristic of the data being edited. Comparing the intent of current edits against the historical intent of the edits made in prior versions originating from the same source document allows the system to intelligently assess whether the edits are in conflict. History-aware semantic analysis results in users being prompted less frequently to resolve conflicts, which improves the user experience.

18 Claims, 16 Drawing Sheets

(51) Int. Cl.
*G06F 16/93* (2019.01)
*G06F 16/955* (2019.01)
*G06Q 10/10* (2012.01)
*G06F 40/166* (2020.01)
*G06F 40/174* (2020.01)
*G06F 40/197* (2020.01)

(52) U.S. Cl.
CPC .......... *G06F 40/166* (2020.01); *G06F 40/174* (2020.01); *G06F 40/197* (2020.01); *G06Q 10/101* (2013.01)

(56) References Cited

U.S. PATENT DOCUMENTS

| | | | |
|---|---|---|---|
| 8,073,812 | B2 | 12/2011 | Curtis |
| 8,413,045 | B2 | 4/2013 | Lemonik et al. |
| 8,453,052 | B1 | 5/2013 | Newman et al. |
| 8,738,706 | B1* | 5/2014 | Grieve .................. G06F 40/151 709/205 |
| 9,785,693 | B2 | 10/2017 | Kapadia |
| 2006/0117075 | A1* | 6/2006 | Cowan ...................... G06F 8/71 |
| 2006/0200755 | A1 | 9/2006 | Melmon et al. |
| 2006/0235984 | A1* | 10/2006 | Kraus .................... G06F 16/958 709/228 |
| 2007/0101256 | A1* | 5/2007 | Simonyi ............... G06F 40/197 715/203 |
| 2008/0313243 | A1* | 12/2008 | Poston .................. G06F 40/197 |
| 2010/0106753 | A1 | 4/2010 | Prabhakaran et al. |
| 2011/0208805 | A1* | 8/2011 | Kasetty ................ G06F 40/194 709/203 |
| 2012/0016849 | A1 | 1/2012 | Garrod et al. |
| 2012/0101980 | A1 | 4/2012 | Taleghani et al. |
| 2012/0110445 | A1* | 5/2012 | Greenspan ............ G06F 40/197 715/256 |
| 2013/0185252 | A1* | 7/2013 | Palmucci .............. G06F 40/197 707/608 |
| 2013/0262373 | A1 | 10/2013 | Rampson |
| 2013/0326330 | A1* | 12/2013 | Harris ................... G06F 40/166 715/234 |
| 2015/0199270 | A1* | 7/2015 | Day-Richter ............. G06F 9/00 707/816 |

OTHER PUBLICATIONS

"Notice of Allowance Issued in U.S. Appl. No. 14/319,997", dated Jun. 6, 2017, 14 Pages.

Cadar, et al., "Multi-Version Software Updates", In Proceedings of the 4th International Workshop on Hot Topics in Software Upgrades, Jun. 3, 2012, pp. 36-40.

Caltro, et al., "Conflict Management for Real-Time Collaborative Editing in Mobile Replicated Architectures", In Proceedings of the thirtieth Australasian Conference on Computer Science, vol. 62, Jan. 30, 2007, pp. 115-124.

Ignat, et al., "A Comparison of Optimistic Approaches to Collaborative Editing of Wiki Pages", In Proceedings of Collaborative Computing: Networking, Applications and Worksharing, Jan. 2007, 10 Pages.

"International Preliminary Report on Patentability Issued in PCT Application No. PCT/US2015/037843", dated Oct. 13, 2016, 8 Pages.

"International Search Report & Written Opinion Issued in PCT Application No. PCT/US2015/037843", dated Oct. 20, 2015, 11 Pages.

"Second Written Opinion Issued in PCT Application No. PCT/US2015/037843", dated May 11, 2016, 6 Pages.

Sun, et al., "A Multi-Version Approach to Conflict Resolution in distributed Groupware Systems", In Proceedings of 20th International Conference on Distributed Computing Systems, Apr. 10, 2000, 10 Pages.

Xue, et al., "An Integrated Post-Locking, Multi-Versioning, and Transformation Scheme for Consistency Maintenance in Real-Time Group Editors", In Proceedings of 5th International Symposium on Autonomous Decentralized Systems, Mar. 26, 2001, pp. 57-64.

U.S. Appl. No. 14/319,997 Amendment and Response filed Aug. 9, 2016, 14 pages.

U.S. Appl. No. 14/319,997 Office Action dated Nov. 15, 2016, 5 pages.

U.S. Appl. No. 14/319,997, Amendment and Response filed Feb. 15, 2017, 8 pages.

"Office Action Issued in European Patent Application No. 15739097.2", dated Oct. 1, 2019, 6 Pages.

"Summons to Attend Oral Proceedings Issued in European Patent Application No. 15739097.2", dated May 12, 2020, 8 Pages.

* cited by examiner

INTELLIGENT CONFLICT DETECTION AND SEMANTIC EXPRESSION OF DOCUMENT EDITS

CROSS-REFERENCE TO RELATED APPLICATIONS

This application is a continuation of U.S. patent application Ser. No. 14/319,997 filed on Jun. 30, 2014, now U.S. Pat. No. 9,785,693 issued on Oct. 10, 2017, entitled "INTELLIGENT CONFLICT DETECTION AND SEMANTIC EXPRESSION OF DOCUMENT EDITS" the disclosure of which is hereby incorporated by reference herein in its entirety.

BACKGROUND

Shared data systems allow users to access copies of document and work offline. Eventually users need to return documents that have been changed to the system. Changes are merged with the stored version residing in the system when the document is submitted. Generally, such systems merge documents by replacing the stored content with the changed content (i.e., value setting). A change to the title and synopsis of the document by a single user may be safely merged with the stored version. Similarly, there is no problem when a first user submits a document with a modified title and a second user submits a document with a modified synopsis. However, the scenario becomes more complicated when multiple users access the same document and separately make changes. The first user to submit an edited version of document with a title change has no trouble, but a conflict arises when a second user attempts to submit version of the same document also containing a title change. The second user must decide which title change to keep.

Conventional conflict detection and resolution in shared data systems generally use a basic content comparison to identify conflicting changes between first document submitted and the second document submitted, particularly in value setting systems. The lack of an exact match in the field value may not always mean a conflict exists, but basic content comparisons will prompt the second user to resolve a conflict every time the changed content from the second document differs from the changed content in the first document. Each conflict that a user must resolve takes time and presents opportunities for users to make inadvertently keep or discard the wrong data. User may also experience uncertainty and frustration when trying to decide how to resolve a conflict. It is with respect to these and other considerations that the present invention has been made. Although relatively specific problems have been discussed, it should be understood that the embodiments disclosed herein should not be limited to solving the specific problems identified in the background.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Embodiments of an intelligent conflict detection system include separate layers for handling write requests and read requests. A journal services write requests (e.g., writes to documents) with one partition scheme. A store services read requests (i.e., reads of views) with another partition scheme, which may be the same or different than the journal partition scheme. The journal sequentially applies edits to a document in the order that the edits are received. In other words, the journal functions to prevent simultaneous updates on the same document.

A conflict detection layer is responsible for determining whether an edit to one version of document being submitted by a user conflicts with an edit to another version of that document which was created since the document was read from the service. Edits to the document are expressed as intents that describe how the document is to be changed rather than explicitly specifying the resulting content. The conflict detection layer evaluates the intent of an edit against the intent of corresponding edits contained in intermediate versions (i.e., versions that are more recent than the source version) of the document. Information about the previous edits may be obtained from history records. Some embodiments may optionally include a set of conflict relationships. The conflict relationships indicate whether intents are compatible or incompatible with each other. Embodiments may define conflict relationships as a set of conflict rules, which may be applied by the conflict detection layer to determine whether the submitted edit conflicts with a prior edit.

In operation, the intelligent conflict detection allows user to obtain a copy of a document for offline use. The copy is associated with the version of the document from which the copy is taken at the time the copy is taken (i.e., the current version of the document). The user may modify the offline copy of the document. Edits to the copy are expressed in terms of an intent corresponding to the data being modified. Intents generally include a verb (i.e., action) intended to achieve the intent. Intents may also have one or more slots that store any parameters of the action. For example, a numeric data type may have an intent to adjust the value by a specified amount that uses the verb "increment" with a slot accepting the number to add to the current field value.

Once the user finishes making edits to the copy, edits made to the copy are received back into the system. When edits are submitted, the baseline version associated with the copy that was edited may be compared to the current version of the document. If the version of the document in the store is newer than the source version of the document (i.e., intermediate versions exist), edits to the copy are evaluated against the edits to each version of the document after the baseline version. The primary focus of the conflict check operation is a semantic evaluation of the intent associated with an edit to copy against the intent of the edits to the corresponding data in each version of the document after the baseline version; however, for edits that are not or cannot be expressed in terms of intent, the conflict check operation may employ other conflict check techniques, such as content equality/inequality. The determination of whether two edits conflict may be based on a set of conflict relationships. The conflict relationships indicate whether intents are compatible or incompatible with each other. Embodiments may define conflict relationships using a set of rules, which may be applied by the conflict detection layer.

If a conflict is detected for any edit belonging to a collection of changes, embodiments of the system may automatically reject the entire collection of changes. Alternatively, edits that do not conflict may be merged with the stored version of the document using the associated intent, the version identifier of the stored document is updated, and a record of the edits to the document is stored. In other embodiments, the user may be prompted to resolve the conflict and given the opportunity to accept or reject the changes as a collection or on a per edit basis.

BRIEF DESCRIPTION OF THE DRAWINGS

Further features, aspects, and advantages of the present disclosure will become better understood by reference to the following figures, wherein elements are not to scale so as to more clearly show the details and wherein like reference numbers indicate like elements throughout the several views.

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems, or devices. Accordingly, embodiments may take the form of a hardware implementation, an entirely software implementation or an implementation combining software and hardware aspects. The following detailed description is, therefore, not to be taken in a limiting sense.

Embodiments of an intelligent conflict detection system are described herein and illustrated in the accompanying figures. The system provides semantic expression of edits and history-aware conflict detection in a large-scale service allowing multiple users to simultaneously work with the same document, which may result in conflicting edits. When submitted, changes to a version of a document are compared to the changes made to all versions of the document created since the edited document was read from the large-scale service. Edits to documents are expressed as intents describing the changes in terms of an action and object of that action based on a characteristic of the data being edited. Comparing the intent of current edits against the historical intent of the edits made in prior versions originating from the same source document allows the system to intelligently assess whether the edits are in conflict. History-aware semantic analysis results in users being prompted less frequently to resolve conflicts, which improves the user experience.

Figure 1:
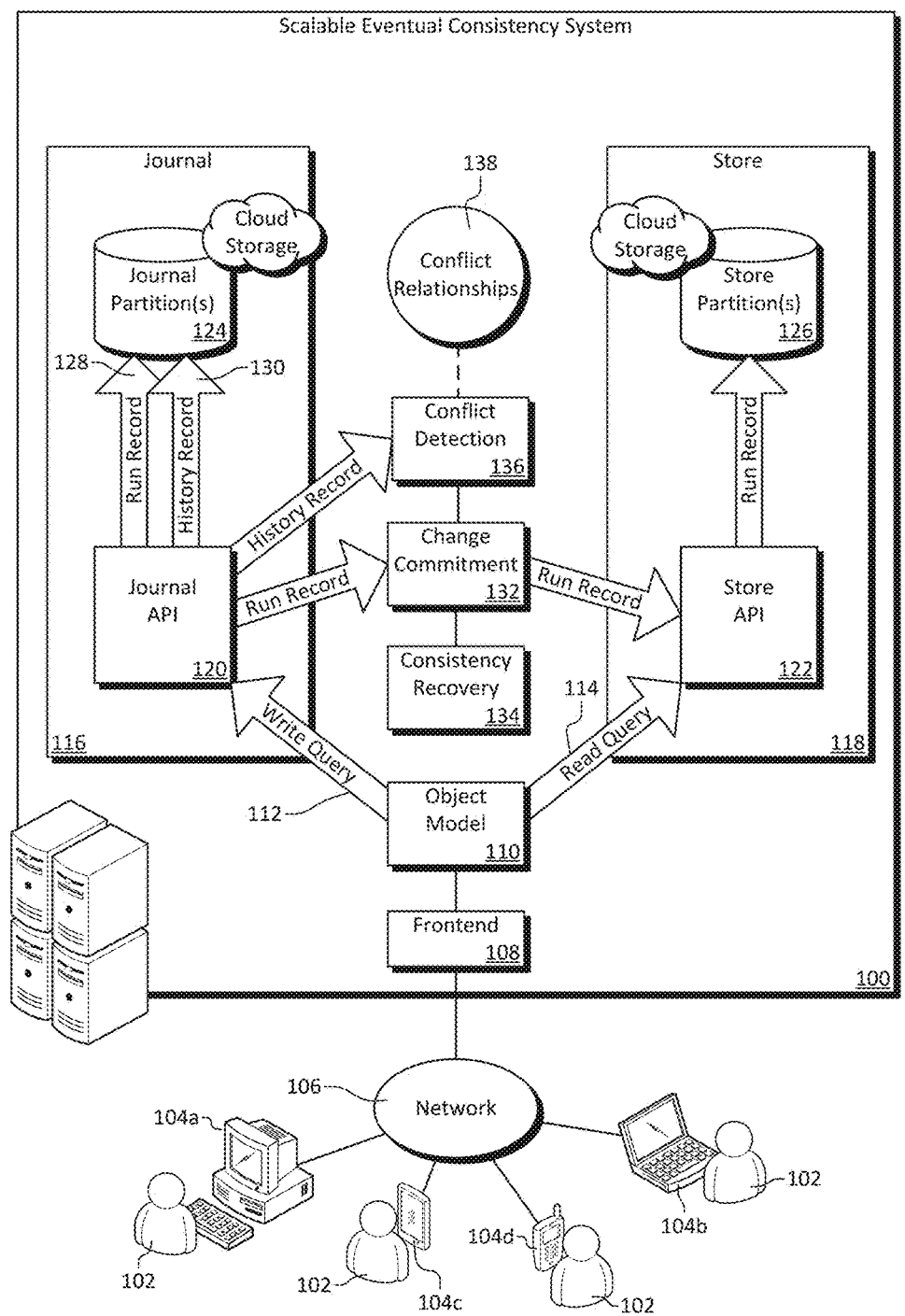
FIG. 1 illustrates a system architecture for one embodiment of the intelligent conflict detection system.

FIG. 1 illustrates a system architecture for one embodiment of the intelligent conflict detection system. The intelligent conflict detection system 100 may be implemented in a service or application storing information that may be accessed and manipulated by multiple users 102. Embodiments of the intelligent conflict detection system are suited for use with a large-scale (i.e., Big Data) service or smaller multi-user services or applications where multiple users may simultaneously access and manipulate the same document. Users may access the service from a variety of client devices 104a-d via a network 106, such as, but not limited to, the Internet, wide area networks, local area networks, and combinations thereof. Examples of suitable client devices include, but are not limited to, desktop computers 104a, laptop computers 104b, tablet computers 104c, mobile phones 104d, personal digital assistants, smartwatches, and smart appliances (e.g., smart televisions).

The intelligent conflict detection system includes a frontend layer 108 providing an entry point to the service. In various embodiments, the service may provide a web-based user interface that is accessible to client devices through a user agent, such as, a browser. In some embodiments, the user agent may be a dedicated client application that provides the user interface and handles communications with the service.

Embodiments of the intelligent conflict detection system include a transactional object model 110 that handles transactions, such as and without limitation, write requests and read requests, allowing users to read, view (i.e., display), create, copy, delete, manipulate (i.e., edit or modify), share, collaborate, or save (i.e., write) documents and views, for the service. The term "document" broadly encompasses any data object handled by the service. Documents may include structured data, unstructured data, metadata, or a combination thereof. Documents may also be associated with external data or metadata, such as data used by the service to identify and track the document. By way of example, for an office or productivity application-based service, documents may include, without limitation, word processing documents, mail items, task items, calendar items, contact items, presentations, spreadsheets, or databases. The term "view" broadly encompasses any index, grouping, or categorization of documents based on a common property value used to present documents to a user. By way of example, views may allow a collection of task items to be displayed by the task owner or by the project with which the task is associated.

The intelligent conflict detection system is suited for use in systems where multiple users have non-exclusive access to documents and can make changes to a document that are not contemporaneously reflected in copies of that document being accessed or manipulated by other users and where conflicting edits to a document are possible. One example is a large-scale service allowing multiple users to access and manipulate a document at the same time. When users access a document, the large-scale service provides each user with a separate offline copies of the source document. Any changes made by a user to an offline copy are merged with the current version of document when the edited copy is saved (i.e., a write request containing edits is submitted).

In addition to simply allowing users to simultaneously and independently edit the same document, large-scale services typically maintain multiple replicas of documents for efficient access and scalability. Changes to a document must be propagated to all replicas. Until all replicas of the document have been synchronized, multiple versions of the document may exist within the system. Depending upon which replica sources the copy provided to the user, that user may not be accessing the latest version of a document.

In the illustrated embodiment, the intelligent conflict detection system is described in the context of a large-scale service as one example of the utility of the intelligent conflict detection system in one of the more complex scenarios; however, use of the intelligent conflict detection system is not limited to large-scale services. Within the large-scale service, write requests 112 and read requests 114 are handled by separate layers. A journal 116 services write requests (e.g., writes to documents) with one partition scheme. A store 118 services read requests (i.e., reads of views) with another a partition scheme, which may be the same or different than the journal partition scheme. In the illustrated embodiment, the journal and the store are represented as a virtualized storage resource (e.g., cloud storage) accessed through corresponding application programming interfaces (APIs), the journal API 120 and the store API 122.

The journal includes at least one document-based partition 124 for storing documents. Each partition is sized based on the largest group of data assigned to a single resource or query. As the amount of data handled by the large-scale service increases, the journal may be linearly scaled and new partitions added. Regardless of the number of journal partitions, the intelligent conflict detection system stores all write requests associated with any given document in the same journal partition. Having a single journal partition associated with each document allows a transactional edit queue to be maintained for each document.

The store includes at least one view-based partition 126 for storing documents. Partitioning the store by view allows documents to be efficiently accessed by multiple users at the same time. If a document is associated with more than one view, each view typically maintains its own copy of the document (i.e., a replica). As with the journal, the store may be linearly scaled and new partitions added to handle additional documents or views.

As users perform actions, such as creating, modifying, or deleting a document, a write request is communicated to the intelligent conflict detection system. Upon receipt, the intelligent conflict detection system first saves the write request to the journal. Changes to a document are considered to be accepted after be the write request has been saved to the journal, but the changes reflected in the write request are generally not visible to all users until they have been merged into the store. When the journal includes multiple partitions, the intelligent conflict detection system may determine a partition identifier indicating the partition to which the write request should be written. In various embodiments, the partition identifier may be based on a document identifier for the document associated with the write request.

The intelligent conflict detection system uses the journal as a staging area for holding write requests until they have been merged into the appropriate views. The journal may also be used when detect conflicting edits to a document. To accomplish these functions, embodiments of the scalable eventually consistent system may save the write request to the journal at least twice upon receipt. One copy of the write request may be saved as a run record 128 that serves as an action item identifying a write request that has not been fully merged with the store. The inability to replicate a write request to the store may be the result of the temporary inaccessibility (e.g., resource failure or downtime) of the partitions or the communications channels (e.g., Internet) between the journal and the store. Another copy of the write request may be saved as history record 130. The history records may be used for purposes such as detecting conflict edits to a document or maintaining audit logs.

A change commitment layer 132 is responsible for propagating write requests from the journal to the store. Document writes flow from the journal to the store so there are no complicated synchronization mechanisms. In various embodiments, the intelligent conflict detection system may make a first attempt to replicate run records to the store as they are created in the journal. Once a run record has been successfully replicated, the run record is deleted from the journal.

A consistency recovery layer 134 is responsible for cycling operation of the change commitment layer and ultimately providing eventual consistency. The consistency recovery layer prompts the change commitment layer to read through the existing records maintained by in the journal and to replicate any run records to the store. In various embodiments, the change commitment layer begins with the oldest run records to make transactional edits to documents in the order that the edits were received by the intelligent conflict detection system. The consistency recovery layer may initiate operation of the change commitment layer based on the occurrence of various events and/or on a periodic basis (e.g., every N minutes, hours, or days). Examples of events that may be used to trigger operation of the change commitment layer include, but are not limited to, system startup, error recovery, and receiving a write request.

A conflict detection layer 136 is responsible for determining whether an edit to a version of a document submitted in a write request conflicts with an edit to another version of that document which was created since the document was read from the large-scale service (i.e., sourced). Edits to the document are expressed as intents that describe how the document is to be changed rather than explicitly specifying the resulting content. The conflict detection layer evaluates the intent of an edit against the intent of corresponding edits contained in intermediate versions (i.e., versions that are more recent than the version that was read from the large-scale service) of the document. Information about the previous edits may be obtained from history records.

Some embodiments may optionally include a set of conflict relationships 138. The conflict relationships indicate whether intents are compatible or incompatible with each other. Embodiments may define conflict relationships as a set of conflict rules, which may be applied by the conflict detection layer to determine whether an edit to a document conflicts with a prior edit.

While a specific embodiment of large-scale service has been described, the intelligent conflict detection system is not limited to the use of any particular large-scale service, including the exemplary large-scale service of FIG. 1. Further, the intelligent conflict detection system is not limited to storage models containing multiple copies of a document or the use of any particular synchronization mechanism, such as that provided by the combination of the journal, the store, the change commitment layer, or the consistency recovery layer. The intelligent conflict detection system is suitable for use with a service or system storing a single copy of each document.

Figure 2:
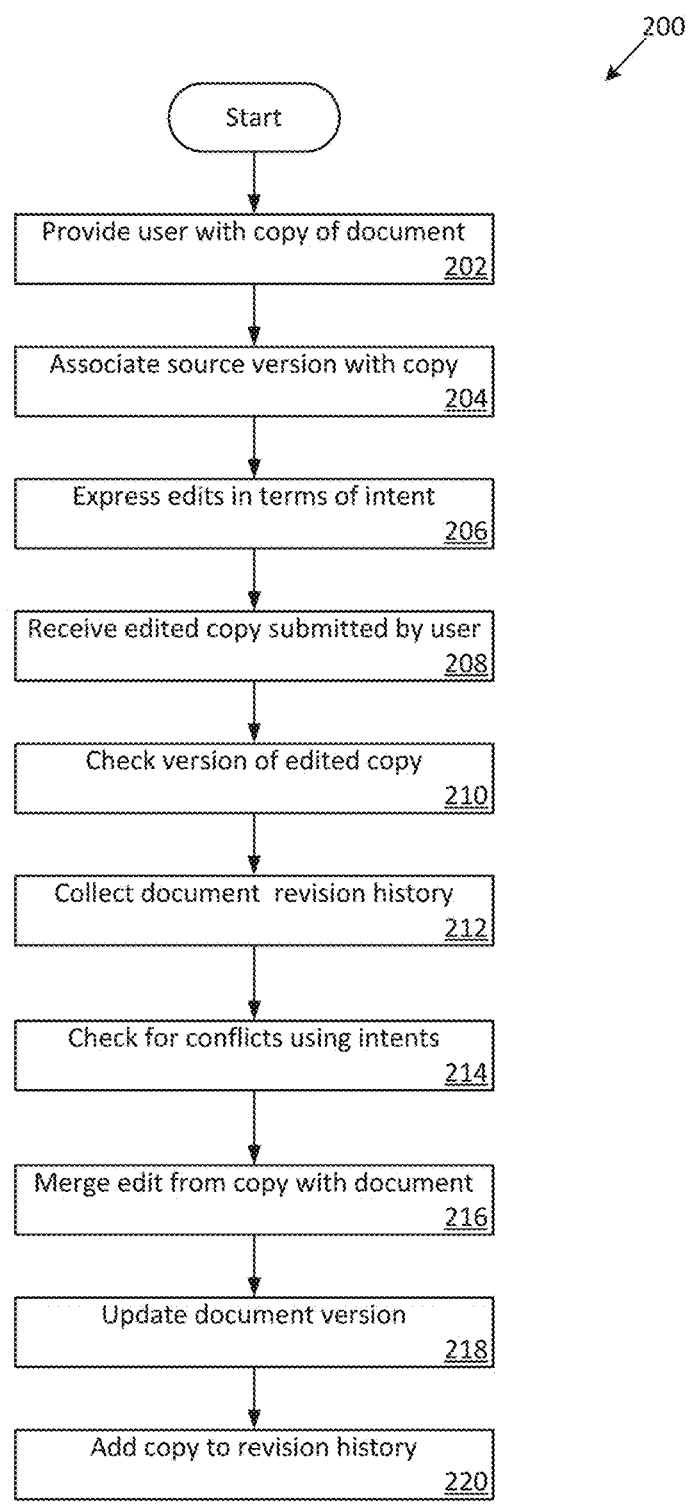
FIG. 2 is a high-level flowchart of one embodiment of the intelligent conflict detection method employed by the intelligent conflict detection system.

FIG. 2 is a high-level flowchart of one embodiment of the intelligent conflict detection method employed by the intelligent conflict detection system. The intelligent conflict detection method 200 begins with a document read operation 202 where a copy of a source document is provided to a user. The copy is taken offline with respect to the source document and the user generally must take some action to save modifications before the changes will be reflected in the source document. For example, the user may be required to submit a document using a web-based form or to initiate a document save function via a user interface. Multiple users may obtain a copy of the same document. Modifications to one copy do not affect other existing copies.

A versioning operation 204 associates the copy with the version of the document from which the copy is taken at the time the copy is taken (i.e., the current version of the document). The version of the document from which the copy is taken may be referred to as the baseline version of the copy. In some embodiments, the version association is stored with the copy, for example, as a metadata or document property value. Alternatively, an identifier corresponding to the copy may be linked to the baseline version and stored by the system, for example, with the document, in a database, or using another suitable data storage object.

The current document version and the baseline version may be designated using a version identifier. The version identifier may be composed of one or more numeric or alphanumeric components forming an identifier that may be incremented or otherwise sequentially updated to distinguish between different versions of the document. Examples of alphanumeric version identifier include, without limitation, "1A, "1B," . . . , "4D," etc., and "1.2.2.2", "1.2.2.1," . . . , "3.1.2.313," etc. In various embodiments, the version identifier may be or may include, without limitation, one or more of a date stamp, time stamp, date/time stamp, hash, checksum, globally unique identifier, or other reference value.

The user may modify the offline copy of the document. Edits may involve, but are not limited to changes of structured data or fields in or associated with (e.g., metadata) the copy. An edit expression operation 206 may expresses edits to the copy in terms of an intent corresponding to the data being modified.

Intents generally include a verb (i.e., an action) intended to achieve the intent. Intents may also have one or more slots that store parameters of the action as slot values. Table 1 shows representative intents for various data types. The data types, verbs, slots, and actions shown in Table 1 are not intended to be limiting. Slots are optional with some intents, and some intents are defined without a slot. For example, an increment action may always increase a value by a magnitude of one and would not require the intent to have a slot. Alternatively, an increment action may default to increasing a value by a magnitude of one unless a slot contains a different value setting a different magnitude for the value increase. In some embodiments, a slot may also hold compound values. For example, an intent to add members to a set may accept a delimited list of members. That list may be parsed and the intelligent conflict detection system process each value from the list separately using the verb associated with the intent. Other embodiments may limit the slot to a single value. For example, an edit adding multiple members to a set may result in the generation of a corresponding number of separate intents, one for each member.

Intents express what the operation means as opposed to what it does. Referring the text data type in Table 1, both intents replace the entire text, but to achieve different goals. Differentiating between the objectives of an edit allows more meaningful conflict detection and produces better results. The following example demonstrates the significance of the intelligence provided by intent-based edits, changing the text value from "Meeting with the client" to "Status report meeting" is a content change altering the meaning of the text. Conversely, changing the text value from "Meett with th client from one to three pm" to "Meet with the client (1 PM-3 PM)" is an editorial change involving corrections of minor spelling errors and formatting of the times, but does not alter the meaning. Semantically, the editorial change conflicts with an accepted content change. In other words, trying to make minor edits to the original while someone else changes the entire meaning creates a conflict. However, the content change does not conflict with an accepted editorial change because the editorial change did not substantively alter the original value. In other words, an editorial change by one user may be treated as a non-event for conflict detection purposes when another user makes a content change at the same time because the editorial changes are irrelevant in the face of substantive changes.

TABLE 1

Exemplary Intents by Data Type

| Data Type | Verbs | Slot(s) | Action |
| --- | --- | --- | --- |
| Numeric | Increment | <amount> | add <amount> to field value |
|  | Decrement | <amount> | subtract <amount> from field value |
| Text | Editorial | <updated text> | <updated text> is editorial change |
|  | Content | <updated text> | <updated text> is substantive change |
| Flag | Set Flag | <value> | sets flag to <value> |
|  | Flip Flag | <none> | toggle binary flag value |
| Date/Time | Advance | <period> | move date/time forward by <period> |
|  | Move Back | <period> | move date/time backward by <period> |
|  | Lengthen | <period> | increase length of date range by <period> |
|  | Shorten | <period> | decrease length of date range by <period> |
| Set | Add | <item> | add item to field value |
|  | Clear | none | clear field value |
|  | DeDupe | none | remove duplicates from field value |
|  | Remove | <item> | remove item from field value |
|  | Sort | <order> | sort field value in <order> direction |
| All data types | Clear | none | clear field value |
|  | Lock | none | restrict changes to field value |
|  | Set | <value> | set (replace) field value to <value> |
|  | Unlock | none | allow changes to field value |

Once the user finishes making edits to the copy, a write operation 208 receives the edits into the system. Because multiple users may simultaneously and independently access and modify the same document, conflict edits to the document are a possibility. Generally, the write operation processes edits in the order that they are received. In other words, the first submitted edit to a field is accepted without any conflict, while subsequent edits to that field are screened for conflicting edits that must be manually resolved, for example, by the user submitting the edits or an authoritative user with the right and/or responsibility to resolve conflicts. Some conflicts may be automatically resolved without user intervention based on a set of rules. For example, if two same-level employees create conflicting edits to a same field, the latter edit may be rejected; however, if a manager's edits conflict with a lower-level employee's edits, the resolution may be to automatically accept the manager's edits.

When an edit is submitted, a version check operation 210 may compare the baseline version of the copy that was edited to the current version of the document. The version check may be based on the equality/inequality of the baseline version identifier associated with the copy and the document version identifier. For example, a document version number greater than the baseline version number indicates that the document has been changed since the copy was sourced or a document version identifier appearing later in a sequence (or series) of version identifiers than the baseline version identifier may corresponding to a later (i.e., more recent) version of the document, which may indicate that the document has be updated since the copy was sourced. Saving a document may correspond to a submitting a write request containing edits in some systems.

Embodiments of the method may use the result of the version check as a preliminary (i.e., threshold) test to determine whether the edits should be screened for conflicts. Equality of the baseline version of the copy and the current version of the document indicates that the document has not changed since the copy was sourced. In other words, version equality indicates that the edits being submitted are the first edits submitted. The first edits submitted may generally be accepted without concern for conflicting edits.

In some embodiments, the version check operation does not involve any direct comparison of version identifiers. Instead, the version check identifies the baseline version of the copy producing the edit being submitted for use in retrieving the relevant document revision history records.

If the version of the document in the store is newer than the version of the document that was sourced or the version check operation does not involve version comparisons, a revision history collection operation 212 collects information corresponding to edits that have been merged with the document after the baseline version. In one example, the revision history may be obtained from the history records (i.e., write requests) maintained in the journal of the large-scale service described herein. Similar types of revision records may be stored by other systems. The revision history collection operation may issue a query for history records with version numbers that are more recent than the baseline version identified by the version check operation, whether or not a version comparison has been performed as part of the version check. The implementation of the method may be conditioned on the relative efficiency of the version comparison and the revision history collection operation.

Once the relevant revision history has been retrieved, a conflict check operation 214 evaluates the edits to the copy against the edits to each version of the document after the baseline version. Embodiment may evaluate the edits in version order starting with the oldest version and preceding the most recent version. The primary focus of the conflict check operation is a semantic evaluation of the intent associated with an edit to copy against the intent of the edits to the corresponding data in each version of the document after the baseline version; however, for those edits that cannot be expressed in terms of intent, the conflict check operation may employ other conflict check techniques, such as content equality/inequality. If a conflict is detected for any edit in the submitted changes, embodiments of the system may automatically reject the entire collection of changes. Alternatively, edits that do not conflict may be merged with the stored version and only the conflicting edit is rejected. In other embodiments, the user may be prompted to resolve the conflict and given the opportunity to accept or reject the changes as a collection or on a per edit basis.

The determination of whether two edits conflict may be based on a set of conflict relationships. The conflict relationships indicate whether intents are compatible or incompatible with each other. Embodiments may define conflict relationships using a set of rules, which may be applied by the conflict detection layer.

Certain conflict relationships may be globally applicable. An intent based on a value setting verb (e.g., set or clear) is generally globally incompatible with other intents because the action is to replace or clear the content of the target field. An intent based on a restrictive verb (e.g., lock) is globally incompatible with other intents because the action is to prevent changes to the target field. Similarly, an intent based on a permissive verb (e.g., unlock) is globally compatible with other intents because the action is to allow changes to the target field.

The compatibility or incompatibility of intents may be conditioned on the verb or the combination of the verb and the slot value. Some conflict relationships may only consider the verbs associated with the intents. Intent based on verbs associated with arithmetic operations (e.g., increment or decrement) should rarely or never conflict regardless of the slot value. The slot value may be used during merging to set the magnitude for the increment or decrement, but the conflict determination can be made without needing to know the slot value.

Other conflict relationships may consider the verbs or both the verbs and slot values associated with the intents. Intents that modify a value, as opposed to replacing it, such as set manipulation intents, an. Intents using the same value modifying verb (e.g., both edits use the verb "add" or both edits use the verb "remove") may be duplicative, but should rarely or never conflict. For example, an intent adding the value "blue" and an intent adding the value "green" would not be in conflict. Similarly, two intents removing the value "blue" would be duplicative, but not in conflict. Conflict relationships for cases such as these may optionally ignore the slot value (e.g., the color) when making a conflict determination. The slot value becomes relevant to the conflict determination for intents using opposing value modifying verbs (e.g., one using the verb "add" and the other using the verb "remove"). For example, an intent adding the value "blue" and an intent removing the value "blue" would be in conflict while an intent adding the value "blue" and an intent removing the value "red" would not.

A merge operation 216 merges collections of edits where none of the edits conflict with prior edits, individual edits that are not in conflict with prior edits, or conflicting edits that were electively retained by the user into the document using the associated intent. A version update operation 218 updates the version identifier of the document. For example, the version identifier may be incremented.

A history management operation 220 stores a record of the edits in a revision history associated with the document. In various embodiments, the edits may be stored individually or as a collection of changes. Conflicting edits that were discarded during the resolution operation may be excluded from the record or marked as discarded.

Figure 3A:
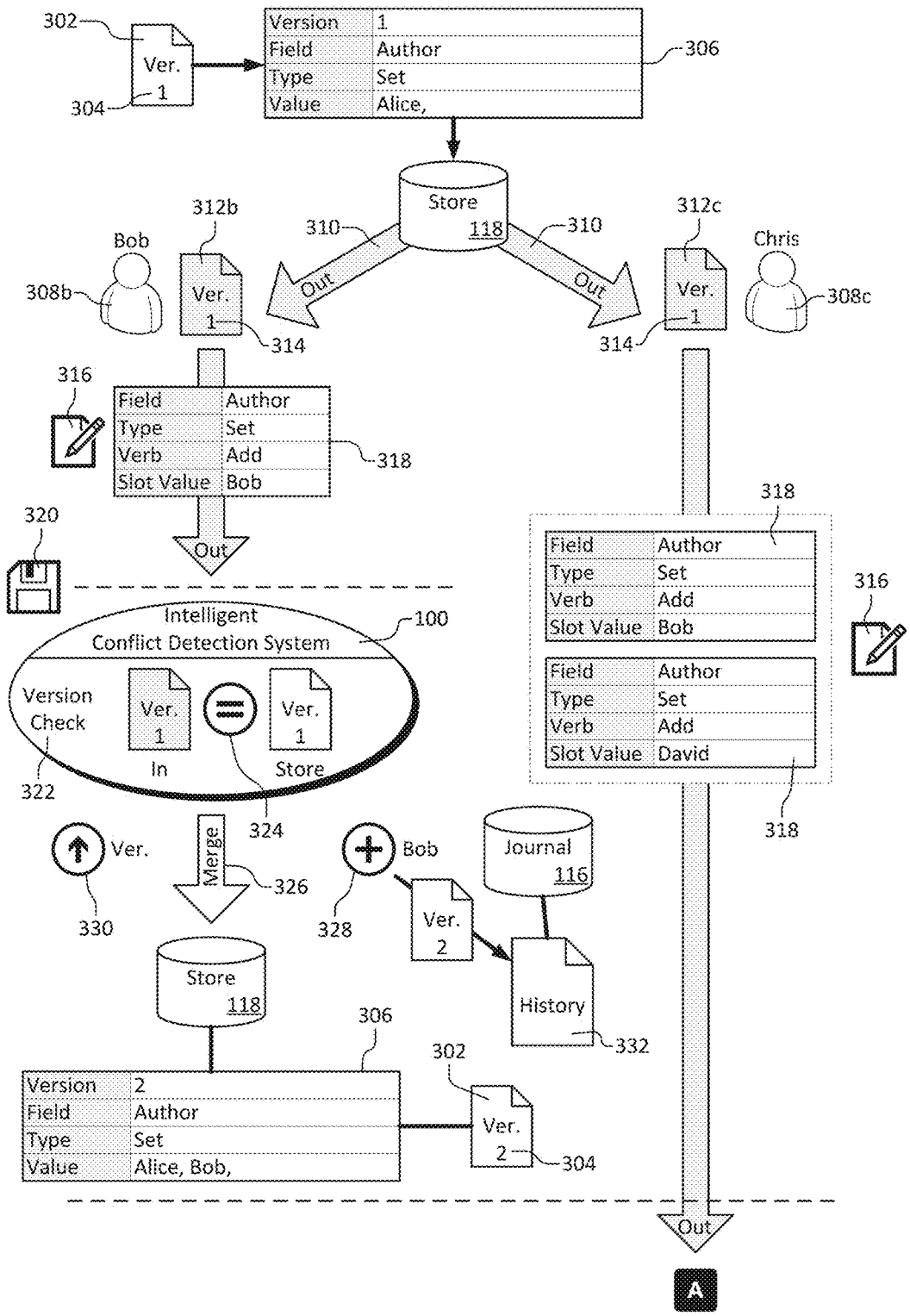
FIGS. 3A and 3B collectively illustrate a flow diagram for a scenario involving an edit to a set value field not resulting in a conflict according to one embodiment of the intelligent conflict detection system.
Figure 3B:
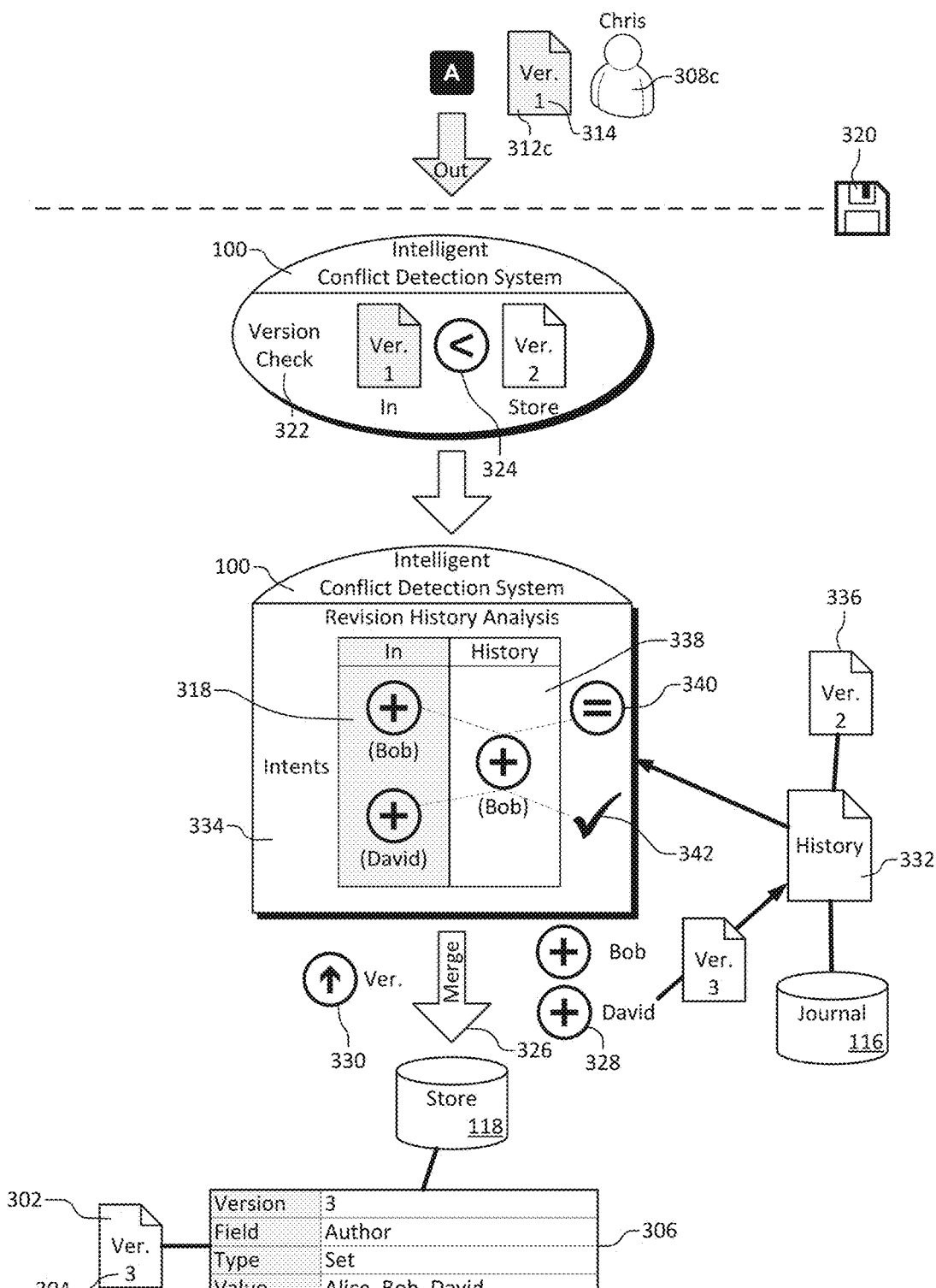

FIGS. 3A and 3B collectively illustrate a flow diagram for a multi-user document editing scenario involving edits to a set value field that do not result in a conflict according to one embodiment of the intelligent conflict detection system. At the start of the flow, the document 302 saved in the store 118 is at version 1 represented by document version identifier 304. The author field 306 of the document is a set value field containing one a set with one member (Alice). Two users, Bob 308b and Chris 308c, independently access 310 the document Each has a separate copy 312b, 312c of the document with which to work. The version identifier of the document at the time the document was accessed is associated with the copies as the baseline version 314. In this scenario, both Bob and Chris obtain copies of version 1 of the document.

Bob edits 316 the author field to add himself as an author. The edit is expressed as an intent 318 composed of the verb "add" and the slot value "Bob" to describe the addition of a member (Bob) to the set. Bob is the first one to submit 320 the edit to his copy of the document. When the edit is submitted, embodiments of the intelligent conflict detection system may perform a version check 322 that compares the baseline version of the copy associated with the edit being submitted against the current version of the document held by the store. Because the comparison 324 determines that store version of the document is the same as the baseline version of the copy, there is no conflict with the edit and the intelligent conflict detection system may merge 326 the edit with the document in the store. In the case of Bob's copy, the author field of the store document is updated with Bob's edit 328 by adding Bob to the set. The intelligent conflict detection system may also increment 330 (or otherwise update) the version identifier of the store document to version 3 in order to indicate that the document has changed from the source version provided to Bob. Additionally, Bob's edits are added to the revision history 332, which may be stored in the journal 116.

Chris also simultaneously edits 316 the author field to add Bob and David as authors. The edit may be expressed as a pair of intents 318, one adding Bob to the set of authors and one adding David to the set of authors, as shown in the illustrated flow. Turning now to FIG. 3B, Chris submits the edit to his copy 320 of the document after Bob. When the version check 322 is performed, the intelligent conflict detection system determines that the document held by the store contains changes that were not included in the copy provided to Chris because the store version is higher 324. Accordingly, the intelligent conflict detection system performs a revision history analysis 334 that evaluates the intent of the edit against all historical versions 336 of the document created since Chris' copy was sourced (i.e., all intermediate versions) appearing in the revision history 332. In this scenario, the only intermediate version is the current version of the document in the store, version 3. Embodiments of the revision history analysis evaluate the historical intents 338 of the changes reflected in the intermediate versions against the intent of the submitted change to provide meaningful conflict detection that goes beyond the content of an intermediate version of the document.

Using conventional conflict checking, Chris' change would be considered a conflicting edit because the content of the author field as edited by Bob and Chris is not identical. Instead, by evaluating the edits semantically on the basis of intent, the intelligent conflict detection system determines that all of the changes to the author field, both Bob's and Chris', are additions to the set. The addition of Bob as an author by Chris is determined to be duplicative of the same change made by Bob and does not create a conflict 340. Likewise, Chris' edit adding David is not in conflict 342 with Bob's edit adding himself as author. It should be appreciated that the intelligent conflict detection system may handle a duplicative edit, such as adding Bob to the set when Bob is already a member of the set. in various ways. For example, the duplicative edit may be ignored (i.e., no merge attempt may be made) or the merge rules may be configured so that a duplicative edit does not create a set with redundant members (i.e., Bob will not appear twice).

Thus, the intelligent conflict detection system accepts Chris' edits 328, merges 326 them into the current version of the document, and the version identifier of the store document is incremented 330 (or otherwise updated) to version 4 to indicate that the document has changed from the version submitted by Bob. Chris' edits are added to the revision history 332.

Figure 4A:
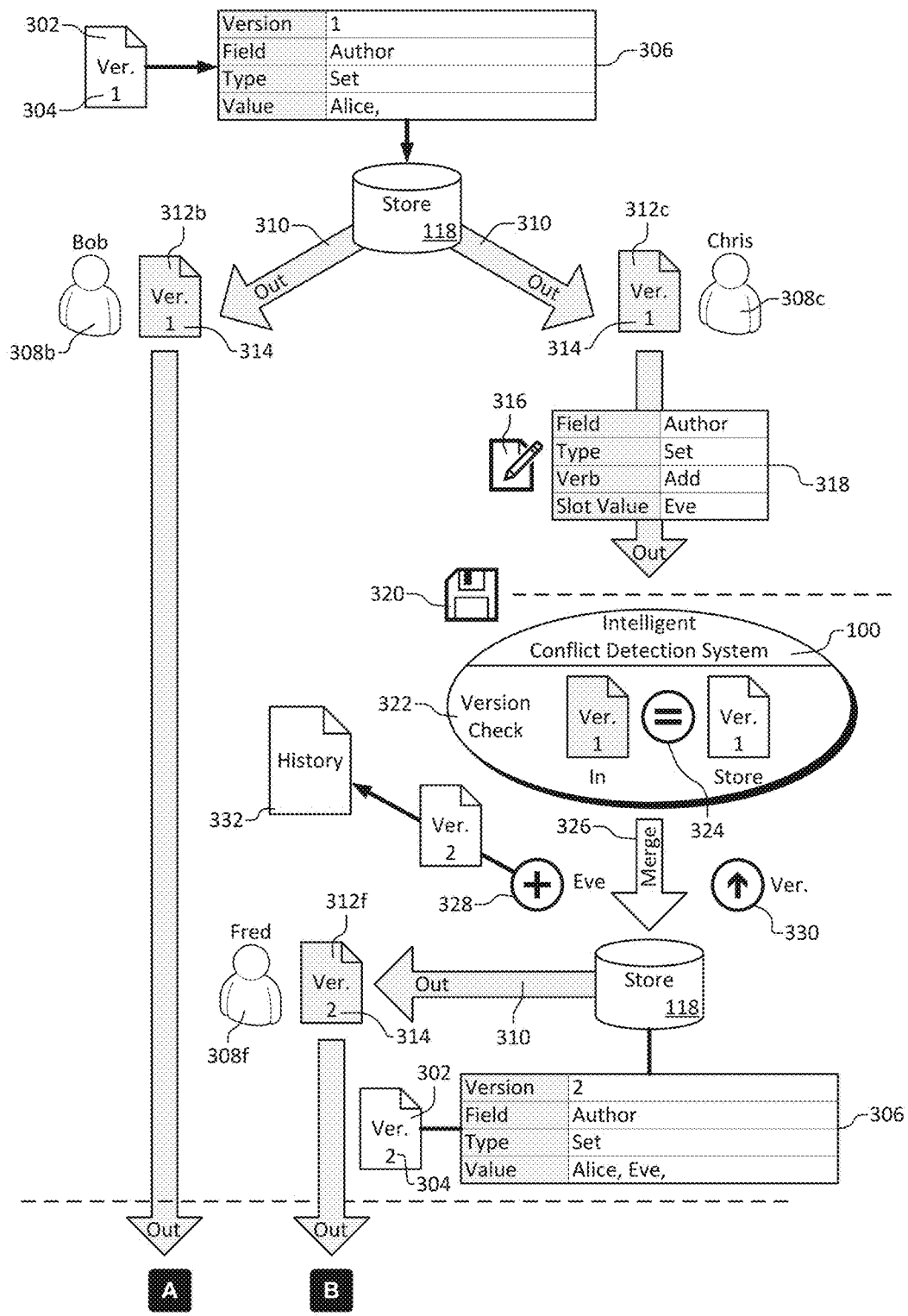
FIGS. 4A through 4C collectively illustrate a flow diagram for a scenario involving an edit to a set value field resulting in a conflict according to one embodiment of the intelligent conflict detection system.
Figure 4B:
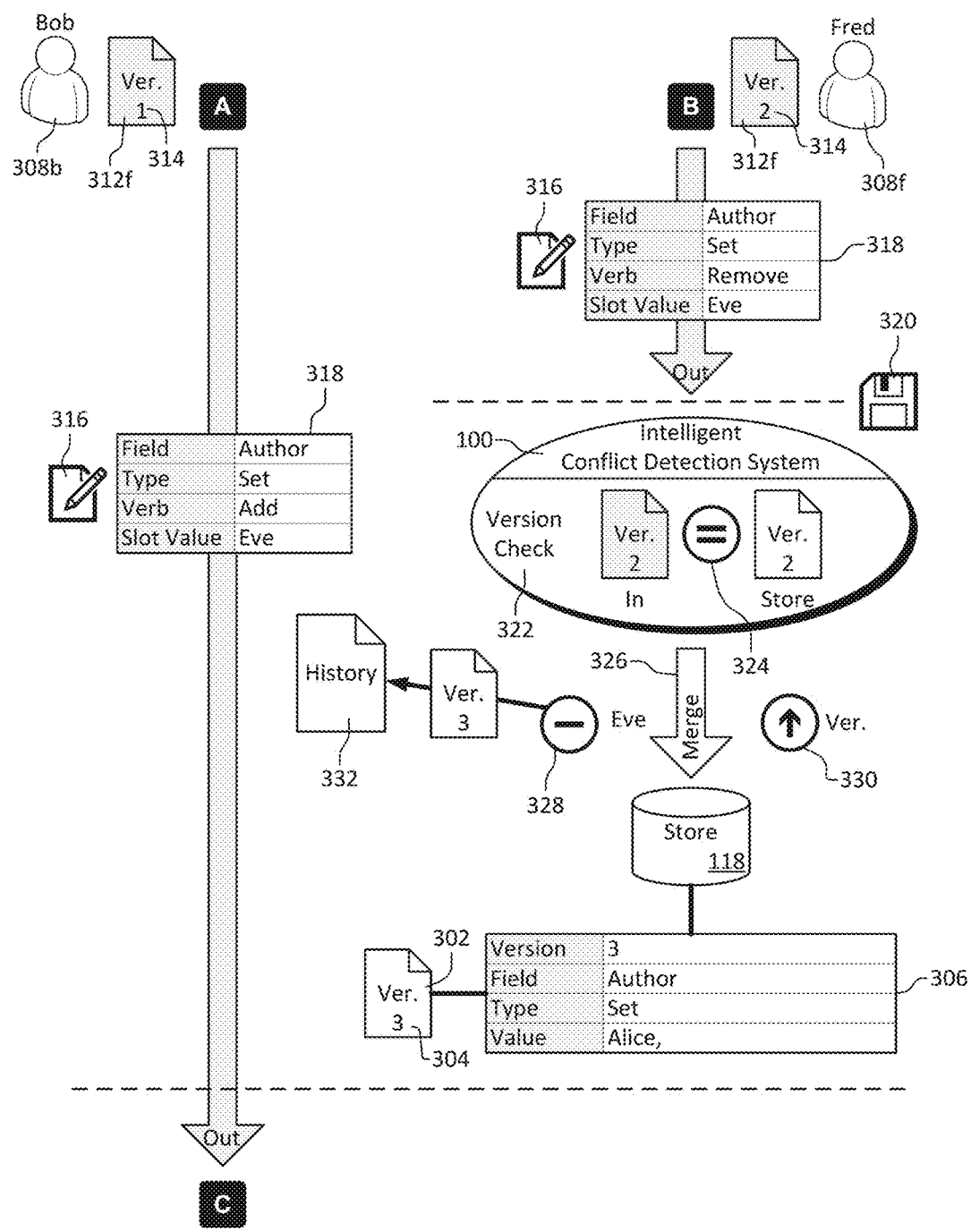
Figure 4C:
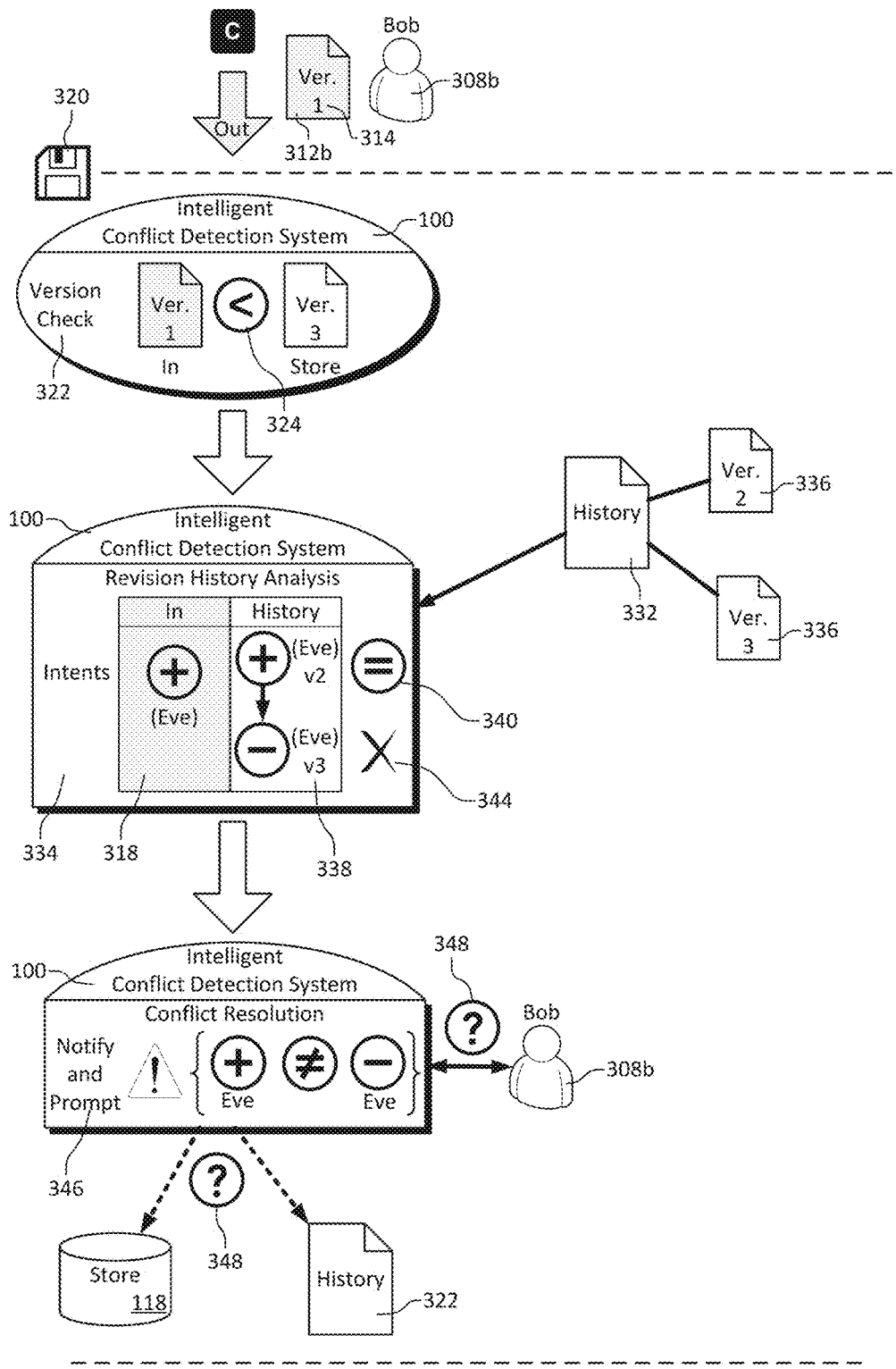

FIGS. 4A through 4C collectively illustrate a flow diagram for a multi-user document editing scenario involving edits to a set value field that results in a conflict according to one embodiment of the intelligent conflict detection system. Much of the flow is similar to that described in relation to FIGS. 3A and 3B with the exception that Chris submits the edit to his copy prior to Bob and Chris' edit adds Eve (instead of Bob) to the author field. No conflict occurs as the baseline version of Chris' copy is the same as current version of document in the store. Chris' edit is accepted and merged into the document to create version 3 of the document.

In this scenario, flow differs in that Fred accesses version 3 of the document before Bob submits the edit to his copy of the document. Turning now to FIG. 4B, Fred does not consider Eve an author and deletes Eve from the author list. Fred's edit is expressed as an intent 318 composed of the verb "remove" and the slot value "Eve" to describe the removal of a member (Eve) from the set. Fred submits 320 the edit to his copy of the document before Bob. Again, no conflict occurs as the baseline version of the Fred's copy is the same as current version of document in the store (i.e., there are no intermediate versions). While Fred's edit has the opposite intent of Chris' edit, there is no conflict because Chris' edit was included in the version of the document provided to Fred and there are no intermediate versions. Accordingly, Fred's edit is accepted and merged into the document to create version 4.

In the meantime, Bob has been editing his copy of document and his edits include adding Eve to the author field. Turning now to FIG. 4C, when the Bob submits the edit to his, both Chris' version (version 3) and Fred's version (version 4) are intermediate versions of the document relative to Bob's baseline version (version 1). Accordingly, the revision history analysis begins by comparing the intent of Bob's edit to the edit made by Chris (i.e., the first accepted edit). The intent of the edits made by both Bob and Chris were to add Eve as an author, so there is no conflict 340. Next, the revision history analysis compares the intent of Bob's edit to the edit made by Fred (i.e., the second accepted edit). Fred's edit removing Eve as an author has the opposite intent of Bob's edit adding Eve as an author. In other words, the edits are incompatible. Because Fred's edit was accepted after Bob obtained a copy of the document (i.e., it appears in an intermediate version relative to the baseline version of Bob's copy), the adverse intents trigger a conflict 344. Flow continues as the intelligent conflict detection system shows the conflict to Bob and prompts 346 him resolve the conflict. Bob's resolution 348 of the conflict, whether to override Fred's edit and add Eve as an author or to omit Eve from the author field as last modified by Fred will be applied to the document in the store. If Bob's edits include other changes, a new version of the document will be created. Conversely, if Bob's only edit was to add Eve as an author and Bob resolves the conflict by respecting Fred's removal of Eve as an author (e.g., Fred may have supervisory authority), there is would be nothing to merge and no new version would be created.

Figure 5A:
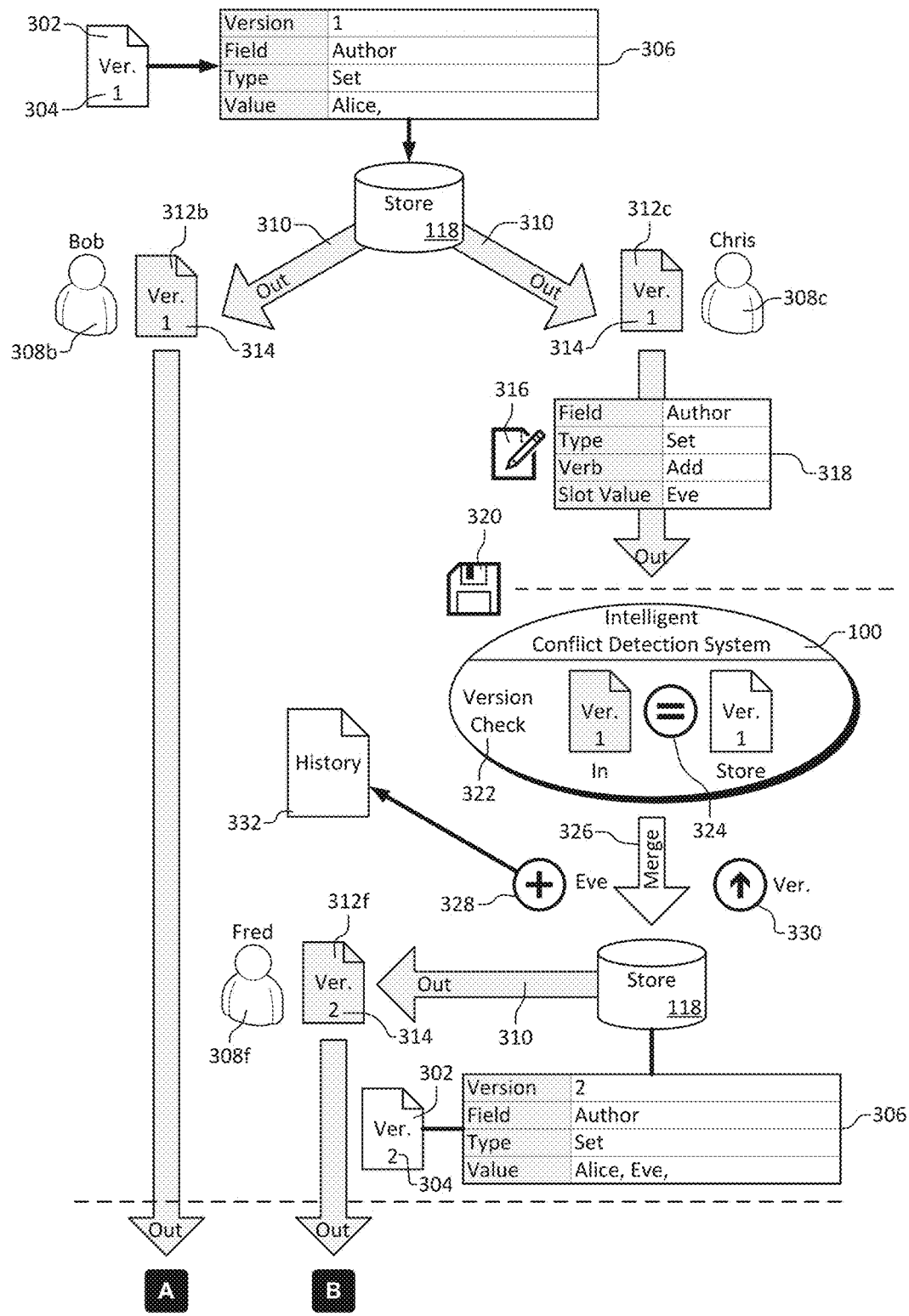
FIGS. 5A through 5D collectively illustrate a flow diagram for an alternate version of the scenario of FIGS. 4A-C not resulting in a conflict according to one embodiment of the intelligent conflict detection system.
Figure 5B:
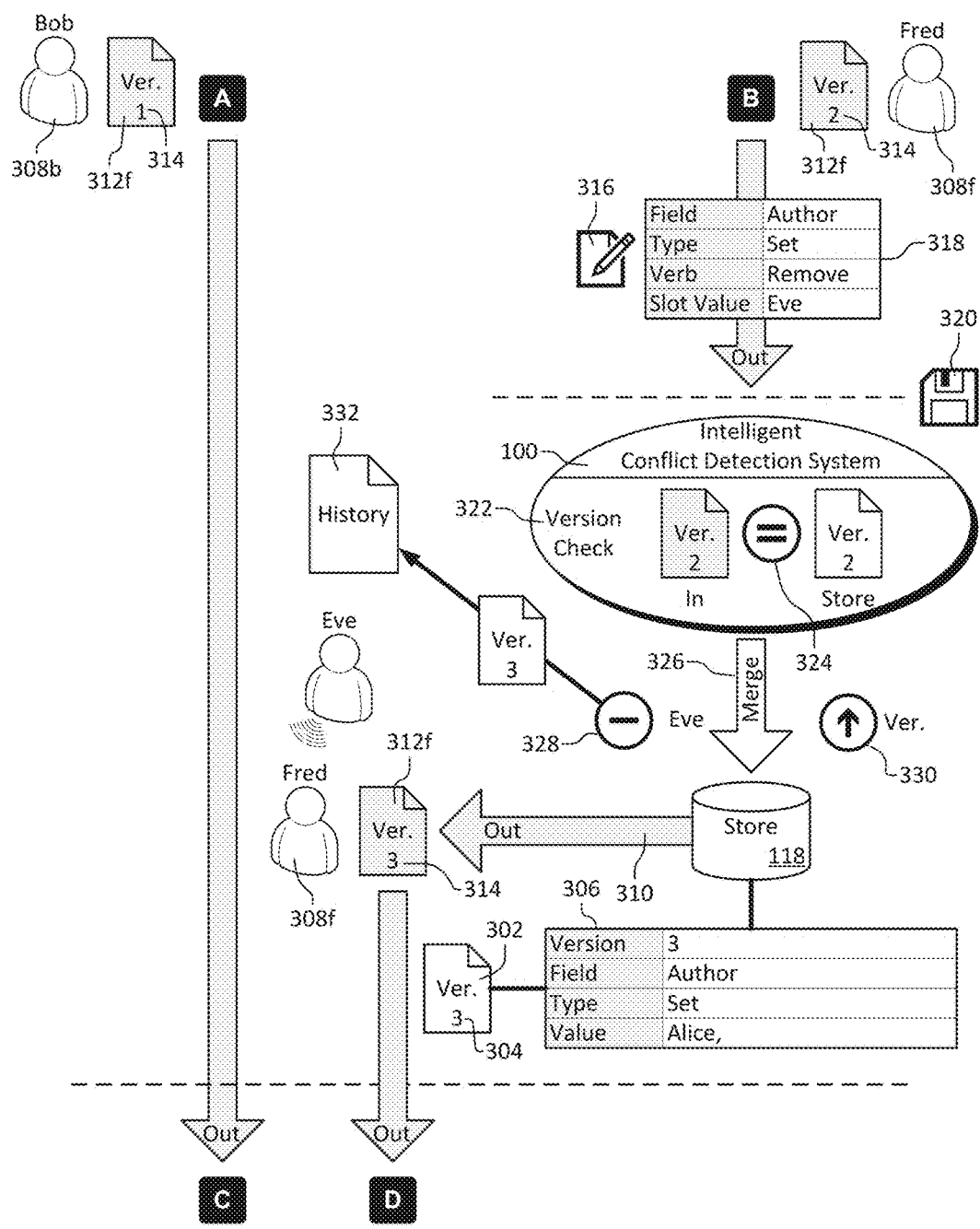
Figure 5C:
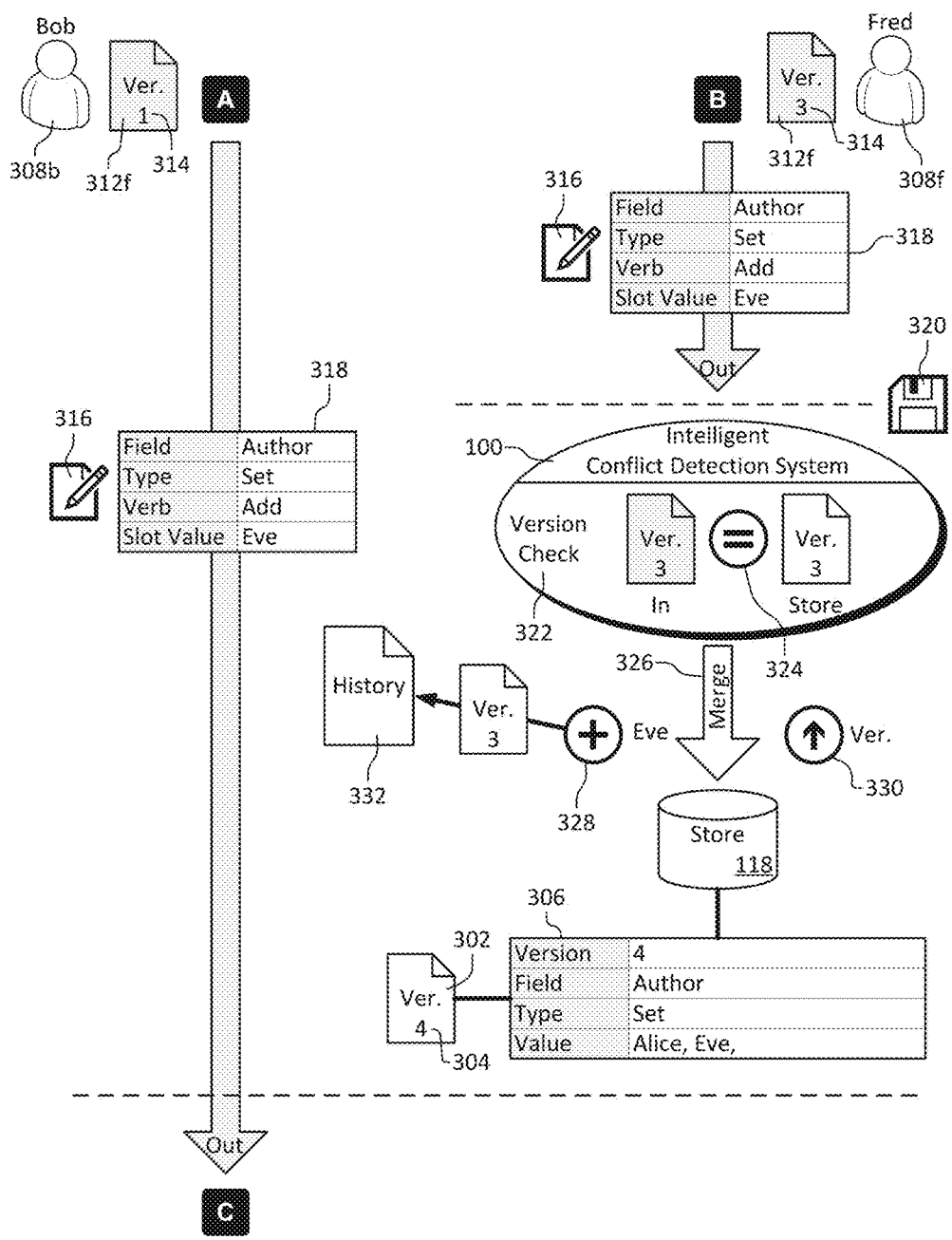

FIGS. 5A through 5D collectively illustrate a flow diagram for an alternate version of the previous scenario that does not result in a conflict according to one embodiment of the intelligent conflict detection system. Flow is identical through the merging of Fred's edit to version 2, which removes Eve as an author and creates version 3. Fred subsequently decides that Eve should be listed as an author (e.g., Eve may plead her case as an author to Fred and win). As a result, Fred accesses 310 the document once again. This time, the baseline version 314 of Fred's copy 312*f* is version 3, which does not include Eve as an author. Turning to FIG. 5C, Fred adds Eve as an author and his edit 316 is expressed as an intent 318 composed of the verb "add" and the slot value "Eve" to describe the addition of a member (Eve) to the set. Once again, Fred submits 320 the edit to his copy before Bob and no conflict occurs as the baseline version of the Fred's copy is the same as current version of document in the store (i.e., there are no intermediate versions). The document is updated to version 4 and Eve included as a member of the set of authors.

Figure 5D:
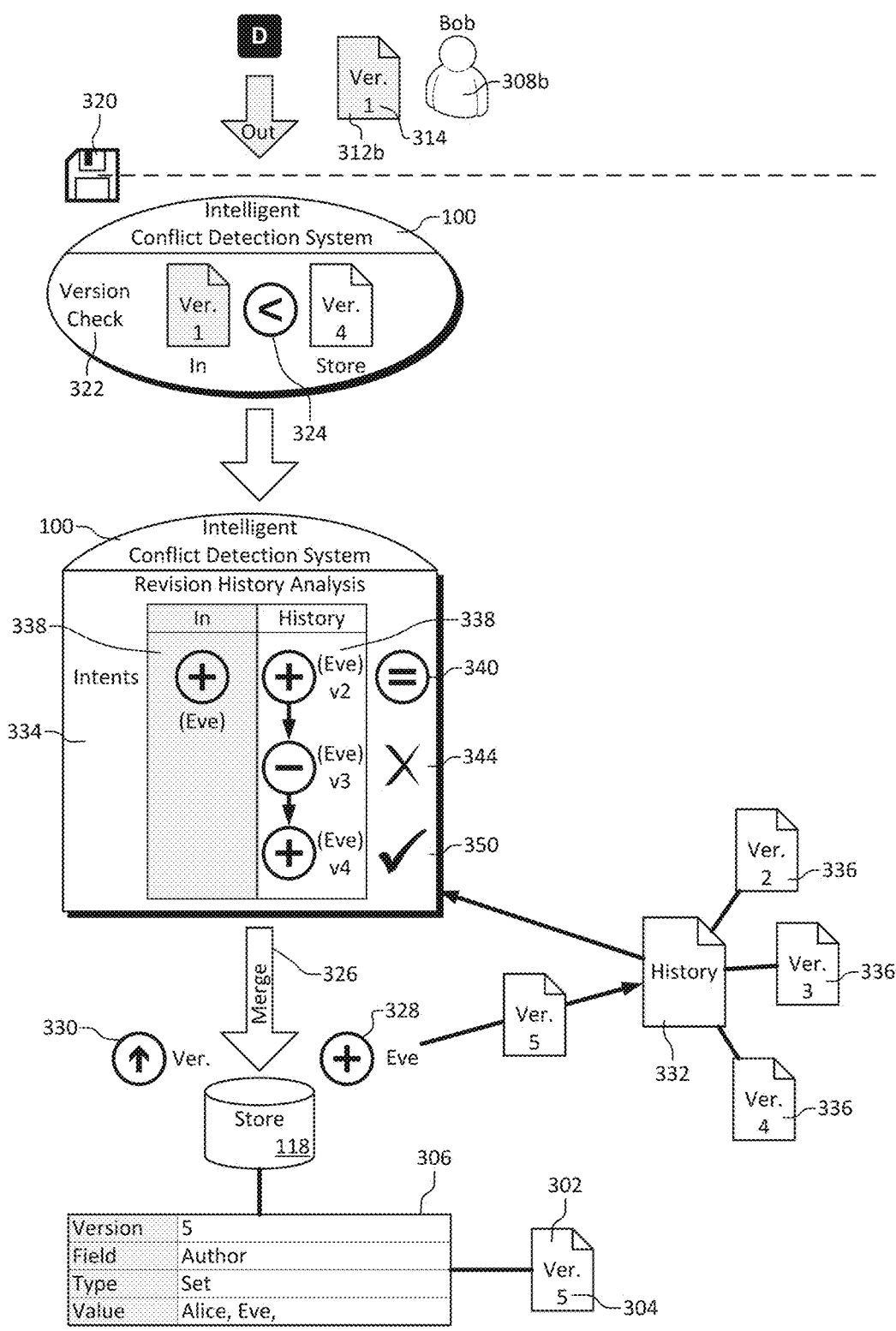

In the meantime, Bob 308*b* has been editing his copy 312*b* of document and his edits 316, which include an intent 318 to add Eve to the author field. Turning now to FIG. 5D, when Bob submits the edit to his copy 320, Chris' version (version 2) and both of Fred's versions (versions 3 and 4) are intermediate versions of the document relative to Bob's baseline version (version 1). There is no conflict 340 between Bob's edit and Chris' edit. Bob's edit potentially conflicts 344 with Fred's first edit removing Eve as an author; however, Fred's second edit restoring Eve as an author is the most recent edit and takes precedence over the earlier conflicting edit. The edit from version 4 effectively cures 350 the potential conflict with the edit from version 3. Although, in the illustrated flow, Fred made both edits, it is not necessary that the curing edit be made by the same user who made the potentially conflicting edit. Accordingly, Bob's edit is accepted without a conflict resolution prompt.

Figure 6A:
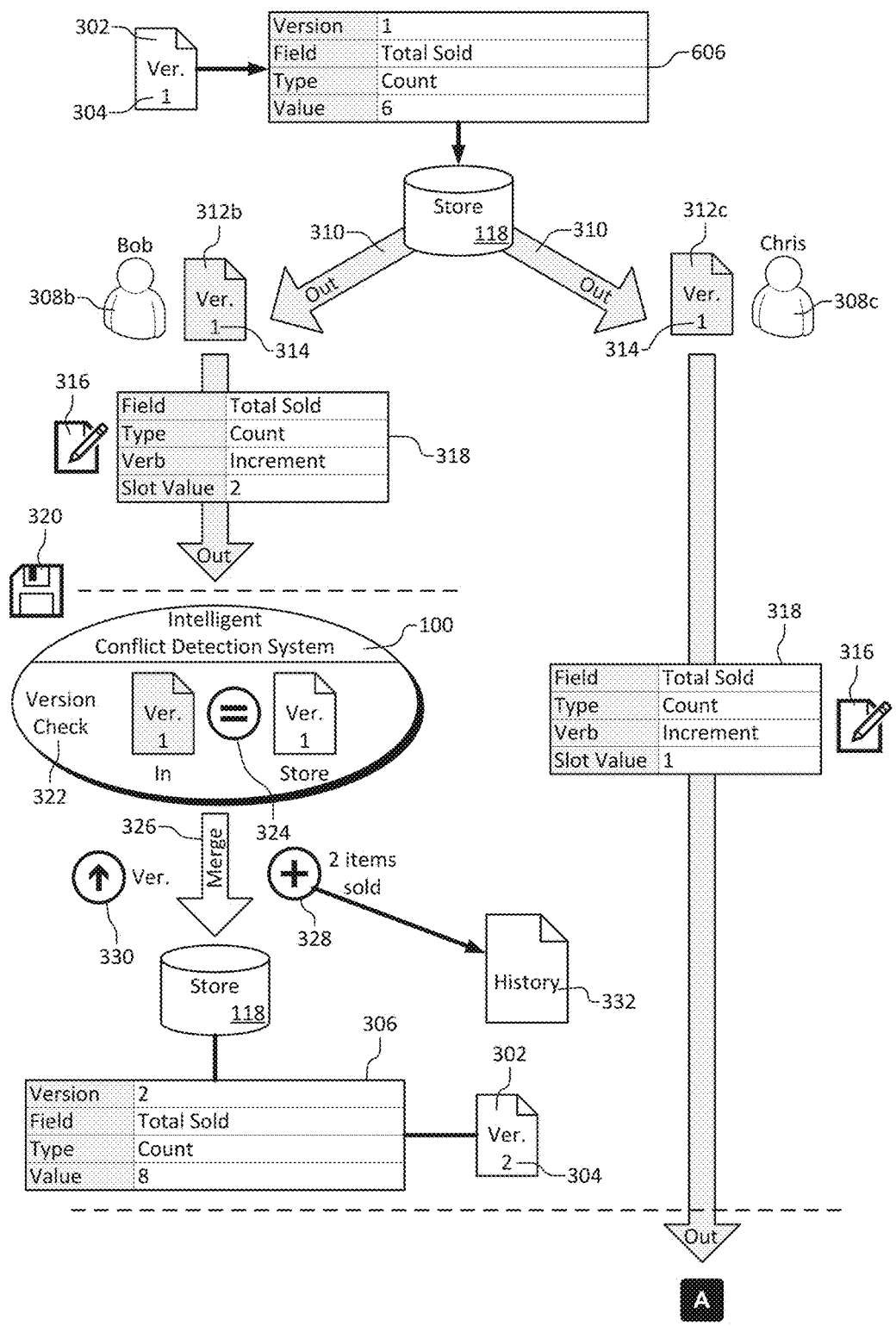
FIGS. 6A and 6B collectively illustrate a flow diagram for a scenario involving an edit to a count value field not resulting in a conflict according to one embodiment of the intelligent conflict detection system.
Figure 6B:
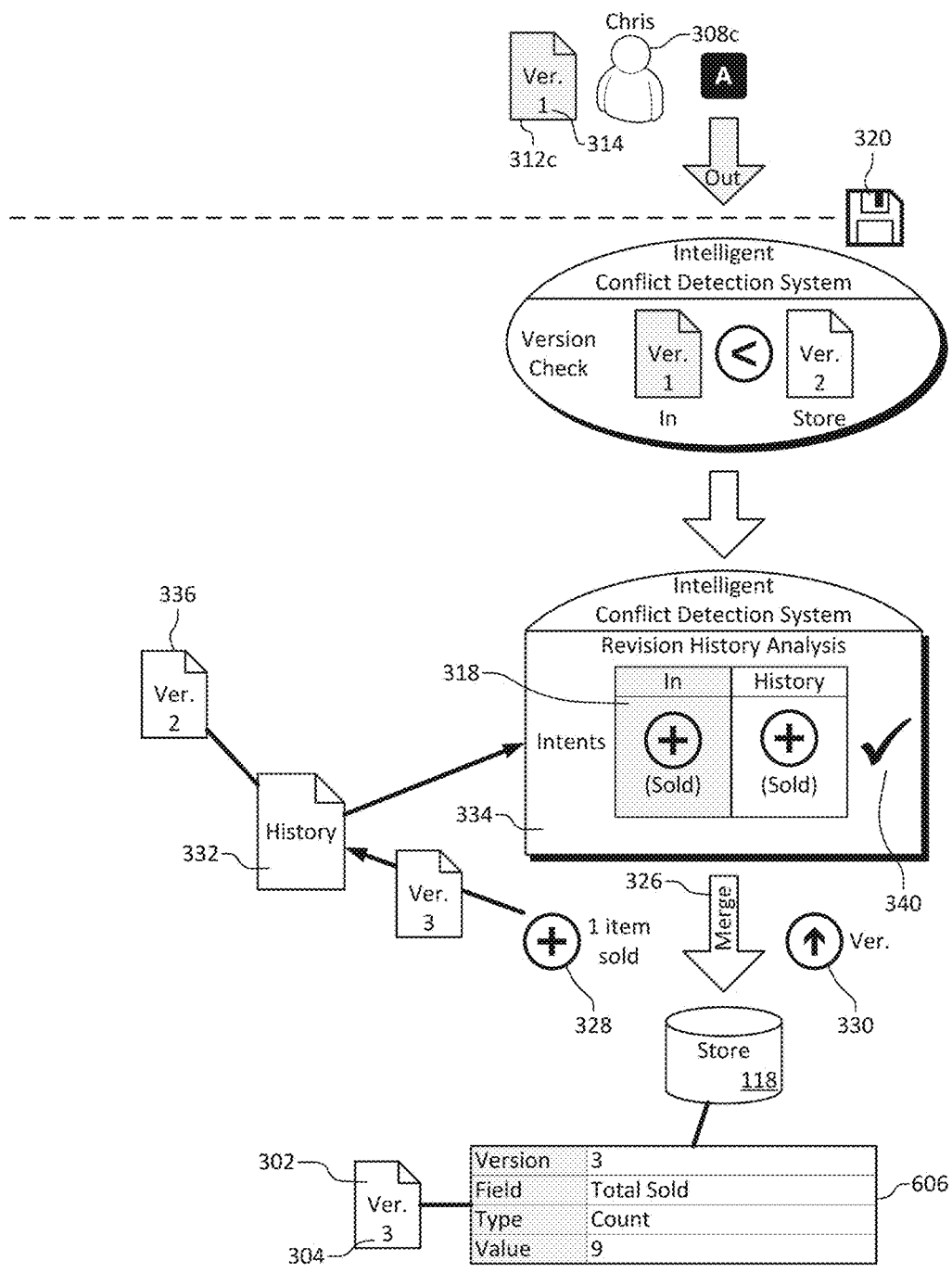

FIGS. 6A and 6B collectively illustrate a flow diagram for a multi-user document editing scenario involving edits to a count value field that results in a conflict according to one embodiment of the intelligent conflict detection system. The general flow tracks the flow of FIGS. 3A and 3B. The primary difference is in the treatment of the edits 316 to a count value field 606, which is shown with a beginning value of six. In this scenario, the count value field tracks total items sold. Bob 308*b* is the first to submit 320 the edit to his copy 312*b* to the total number of items sold expressed as an intent to increment (i.e., the verb) the count value by two (i.e., the slot value). Note that, in some embodiments, Bob may have entered a value of eight and the change is translated into the intent 318 by determining the difference between the source value and the value entered by Bob. Other embodiments, Bob may be presented with the opportunity to enter a change to the value and the total items sold would be calculated and the result used to populate the total items sold field. No conflict occurs as the baseline version of the Bob's copy is the same as current version of document in the store (version 1). Bob's edit is merged 326 by incrementing the total items sold field by two, bringing the value of the total items sold field to eight, and produces version 2 of the document 304.

Subsequently, Chris 308*c* submits an edit 316 to the total number of items sold expressed as an intent 318 to increment the count value by one. Version 2 of the document 304 serves as intermediate version relative to the baseline version of Chris' copy. The illustrated flow shows a revision history analysis 334 undertaken due to the existence of the intermediate version determining that no conflict exists 340. Accordingly, Chris' edit is merged 326 by incrementing the total items sold field by one, bringing the value of the total items sold field 606 to nine. Merging Chris' edit results in the creation of version 3 of the document 304.

The operation of embodiments of the intelligent conflict detection system may vary while still producing the desired result of no conflict. For example, some embodiments of the intelligent conflict detection system may employ rules that do require a full revision history analysis when dealing with certain data types, such as count value data types.

In contrast to edits limited to value setting, this scenario further illustrates how semantic expression using intents allows the intelligent conflict detection system to accept edits having opposite effects (e.g., one incrementing and the other decrementing a value) without triggering a conflict. For example, in the flow of FIGS. 6A and 6B, an intent to decrement the count value (e.g., indicating items returned) preceded or followed by an intent to increment the count value (e.g., indicating items sold) would not give rise to a conflict. In contrast, a conventional conflict detection system comparing simultaneous edits expressed as final values would require conflict resolution. Bob's edit would place a value of eight in the total number of items sold while Chris' edit would place a final value of seven for the number of items sold. Because the values for the total items sold would be different, a conventional conflict detection system could not resolve Chris' edit with Bob's edit and would prompt Chris for a resolution.

The subject matter of this application may be practiced in a variety of embodiments as systems, devices, and other articles of manufacture or as methods. Embodiments may be implemented as hardware, software, computer readable media, or a combination thereof. The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 7:
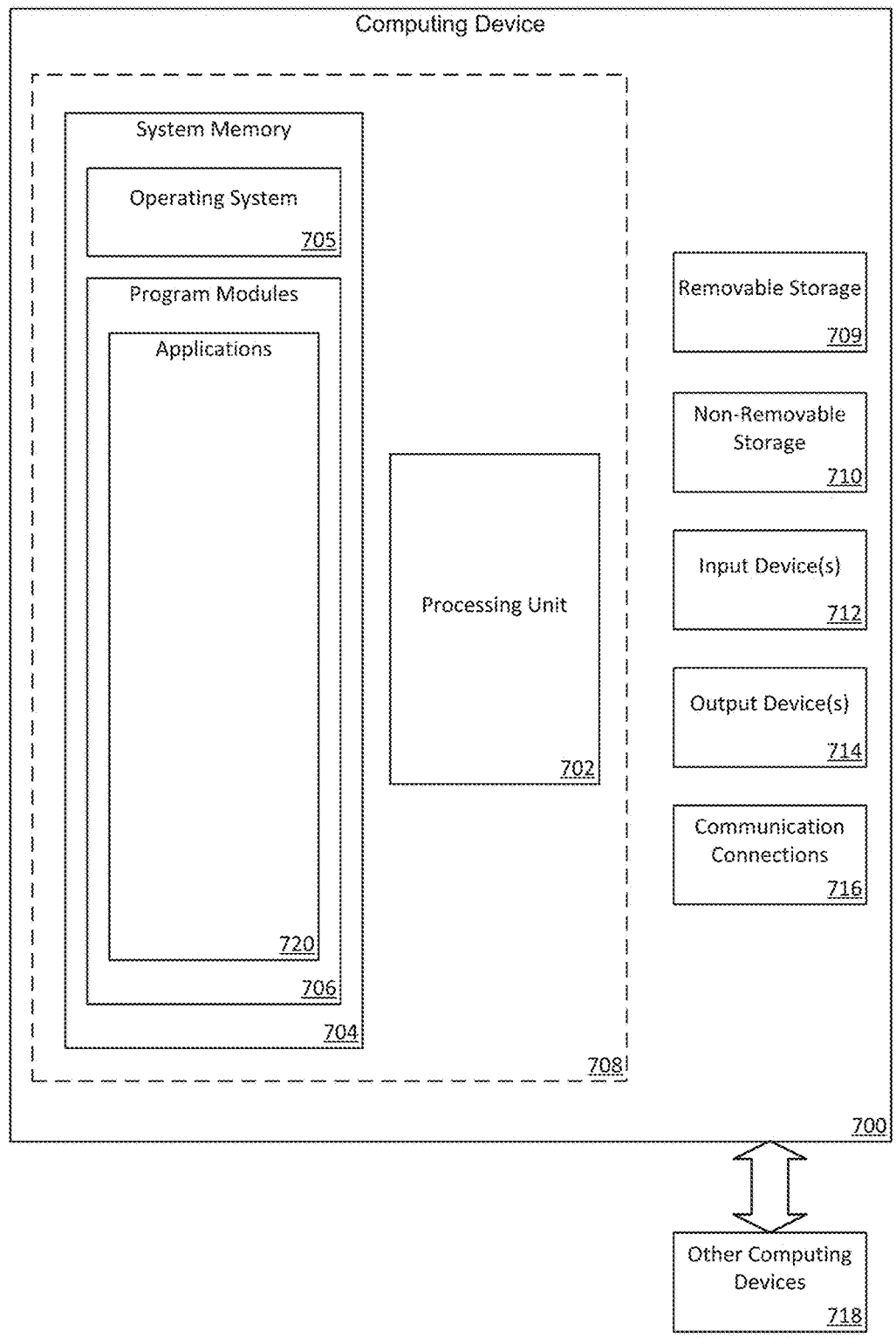
FIG. 7 is a block diagram illustrating one embodiment of the physical components of a computing device with which embodiments of the present invention may be practiced.

FIGS. 7 and 8 and the associated descriptions provide a discussion of a variety of operating environments in which embodiments of the invention may be practiced. However, the devices and systems illustrated and discussed are for purposes of example and illustration and are not limiting of a vast number of computing device configurations that may be utilized for practicing embodiments of the invention described above.

FIG. 7 is a block diagram illustrating physical components (i.e., hardware) of a computing device 700 with which embodiments of the invention may be practiced. The computing device components described below may be suitable for embodying computing devices including, but not limited to, a personal computer, a tablet computer, a surface computer, and a smart phone, or any other computing device discussed herein. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running software applications 720, such as components of the intelligent conflict detection system 100. For example, the operating system 705 may be suitable for controlling the operation of the computing device 700. Furthermore, embodiments of the invention may be practiced in conjunction with a graphics library, other operating systems, or any other application program and is not limited to any particular application or system. This basic configuration is illustrated by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated by a removable storage device 709 and a non-removable storage device 710.

As stated above, a number of program modules and data files may be stored in the system memory 704. While executing on the processing unit 702, the software applications 720 may perform processes including, but not limited to, one or more of the stages of the intelligent conflict detection method 200. Other program modules that may be used in accordance with embodiments of the present invention may include electronic mail and contacts applications, word processing applications, spreadsheet applications, database applications, slide presentation applications, drawing applications, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the illustrated components may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein with respect to the software applications 720 may be operated via application-specific logic integrated with other components of the computing device 700 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 700 may also have one or more input device(s) 712 such as a keyboard, a mouse, a pen, a sound input device, a touch input device, etc. The output device(s) 714 such as a display, speakers, a printer, etc. may also be included. The aforementioned devices are examples and others may be used. The computing device 700 may include one or more communication connections 716 allowing communications with other computing devices 718. Examples of suitable communication connections 716 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all examples of computer storage media (i.e., memory storage). Computer storage media may include random access memory (RAM), read only memory (ROM), electrically erasable read-only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700.

Figure 8A:
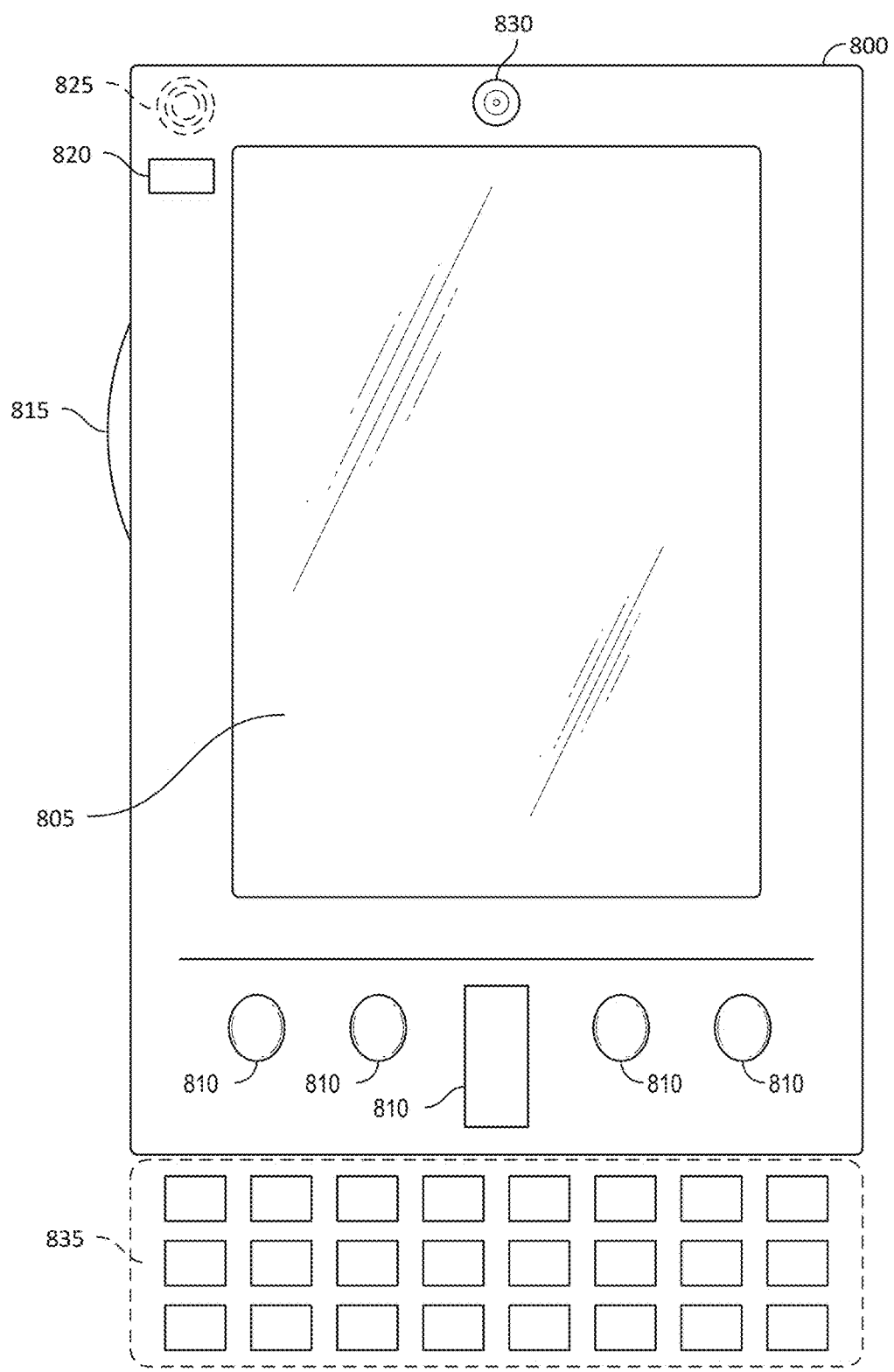
FIGS. 8A and 8B are simplified block diagrams of a mobile computing device with which embodiments of the present invention may be practiced.
Figure 8B:
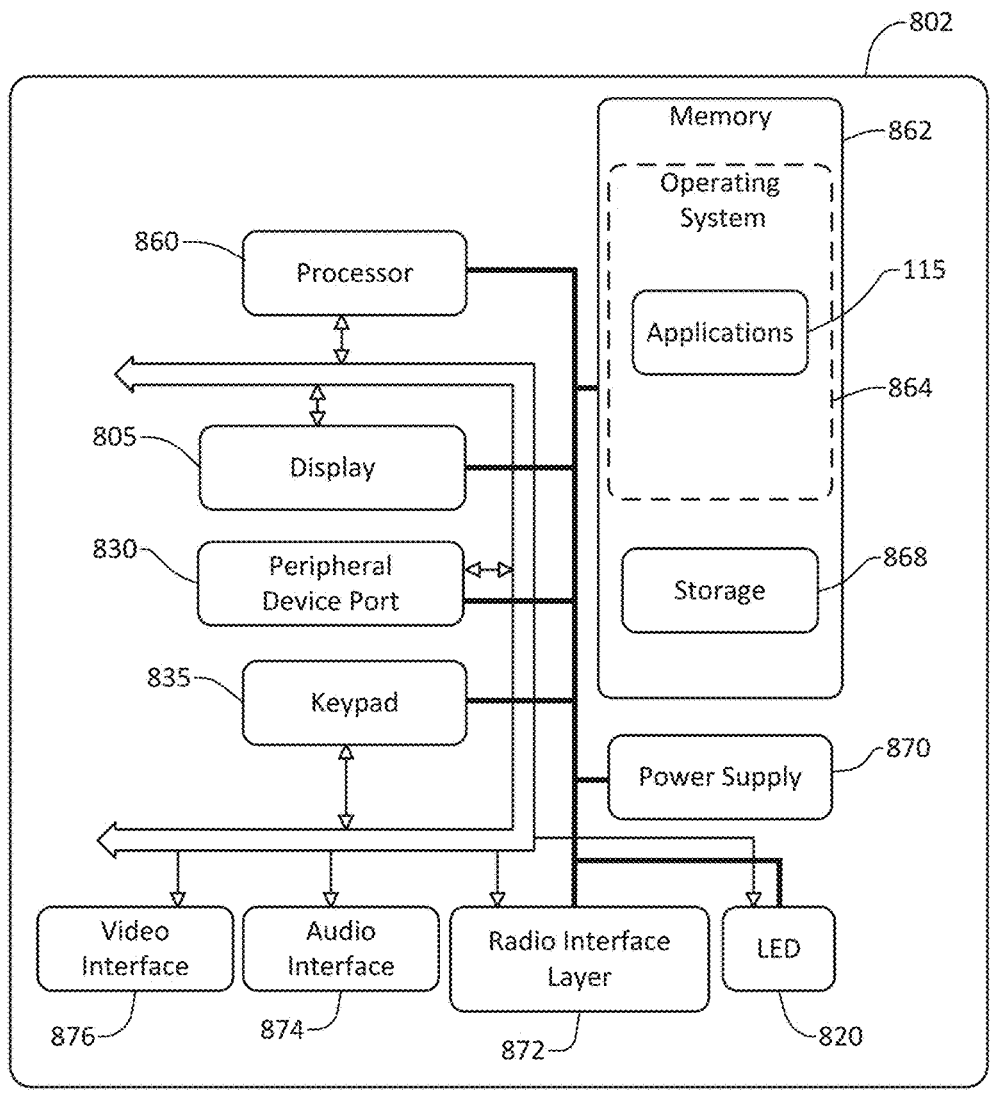

FIGS. 8A and 8B illustrate a mobile computing device 800 with which embodiments of the invention may be practiced. Examples of suitable mobile computing devices include, but are not limited to, a mobile telephone, a smart phone, a tablet computer, a surface computer, and a laptop computer. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative embodiments, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad

835. Optional keypad 835 may be a physical keypad or a "soft" keypad generated on the touch screen display. In various embodiments, the output elements include the display 805 for showing a graphical user interface, a visual indicator 820 (e.g., a light emitting diode), and/or an audio transducer 825 (e.g., a speaker). In some embodiments, the mobile computing device 800 incorporates a vibration transducer for providing the user with tactile feedback. In yet another embodiment, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one embodiment of a mobile computing device. That is, the mobile computing device 800 can incorporate a system (i.e., an architecture) 802 to implement some embodiments. In one embodiment, the system 802 is implemented as a smart phone capable of running one or more applications (e.g., browsers, e-mail clients, notes, contact managers, messaging clients, games, and media clients/players). In some embodiments, the system 802 is integrated as a computing device, such as an integrated personal digital assistant (PDA) and wireless phone.

One or more application programs 865 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 865 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800, including software applications 720 described herein.

The system 802 has a power supply 870, which may be implemented as one or more batteries. The power supply 870 might further include an external power source, such as an AC adapter or a powered docking cradle that supplements or recharges the batteries.

The system 802 may also include a radio 872 that performs the function of transmitting and receiving radio frequency communications. The radio 872 facilitates wireless connectivity between the system 802 and the outside world via a communications carrier or service provider. Transmissions to and from the radio 872 are conducted under control of the operating system 864. In other words, communications received by the radio 872 may be disseminated to the application programs 865 via the operating system 864, and vice versa.

The visual indicator 820 may be used to provide visual notifications, and/or an audio interface 874 may be used for producing audible notifications via the audio transducer 825. In the illustrated embodiment, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present invention, the microphone may also serve as an audio sensor to facilitate control of notifications, as will be described below. The system 802 may further include a video interface 876 that enables an operation of an on-board camera 830 to record still images, video streams, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio 872 or via a distributed computing network. Similarly, such data/information may be readily transferred between computing devices for storage and use according to well-known data/information transfer and storage means, including electronic mail and collaborative data/information sharing systems.

The description and illustration of one or more embodiments provided in this application are intended to provide a complete thorough and complete disclosure the full scope of the subject matter to those skilled in the art and not intended to limit or restrict the scope of the invention as claimed in any way. The embodiments, examples, and details provided in this application are considered sufficient to convey possession and enable those skilled in the art to practice the best mode of claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method for detecting conflicting edits to content stored in a data system, the method comprising:
receiving a first edit to a first copy of a source version of content, the first edit expressed as a first intent indicating a first action to be performed on a first field of the first copy of the content, wherein the first intent includes a verb and a slot, the verb corresponding to the first action and the slot containing a value corresponding to the first edit;
receiving a second edit to a second copy of the source version of content, the second edit expressed as a second intent indicating a second action to be performed on the first field of the second copy of the content;
identifying historical versions of the content since the source version of content was sourced;
automatically determining whether a conflict exists based on performing semantic analysis on intents of edits received in the source version and historical intents of edits made in the historical versions, wherein performing the semantic analysis includes determining whether the first action of the first intent is compatible with the second action of the second intent, and comparing the first intent against the second intent and the historical intents when the first action is compatible to the second action; and
responsive to determining that no conflict exists, merging the second edit to the second copy of the content with the first edit to the first copy of the content, wherein the merging includes performing the first action on the first field to replace a value of the first field with a first modified value and performing the second action on the first field to replace the first modified value of the first field with a second modified value.

2. The method of claim 1, further comprising prompting a user for resolution of a conflicting edit if the second intent conflicts with the first intent.

3. The method of claim 1, wherein the first intent is based on a characteristic of the first field in a document.

4. The method of claim 3, wherein the characteristic of the first field is a data type.

5. The method of claim 1, wherein the content is associated with a version identifier, the method further comprising associating the version identifier of the content with each copy of the content as a baseline version when the copy is sourced.

6. The method of claim 5, further comprising updating the version identifier associated with the content to indicate that a document has changed from the source version to a different version when an edit to one of the first copy or the second copy is merged with the document.

7. The method of claim 1, further comprising storing the first and second edits in a revision history.

8. The method of claim 7, further comprising comparing a third edit to each edit stored in the revision history to determine if the third edit conflicts with an edit stored in the revision history.

9. The method of claim 8, further comprising:
selecting one or more edits stored in the revision history; and
determining that a conflict exists when an intent of the third edit is incompatible with an intent of any of the selected one or more edits.

10. The method of claim 9, further comprising determining that no conflict exists if a more recent edit removes incompatibility.

11. A system for detecting conflicting edits to a document, the system comprising:
a storage system for storing documents; and
a conflict detection engine executed by a computing device comprising a processor and a memory, the conflict engine operable to:
receive a first edit to a first copy of a source version of content associated with a document, the first edit expressed as a first intent indicating a first action to be performed on a first field of the first copy of the content, wherein the first intent includes a verb and a slot, the verb corresponding to the first action and the slot containing a value corresponding to the first edit;
receive a second edit to a second copy of the source version of content associated with the document, the second edit expressed as a second intent indicating a second action to be performed on the first field of the second copy of the content;
identify historical versions of the content since the source version of content was sourced;
automatically determine whether a conflict exists based on performing semantic analysis on intents of edits received in the source version and historical intents of edits made in the historical versions, wherein performing the semantic analysis includes determining whether the first action of the first intent is compatible with the second action of the second intent, and comparing the first intent against the second intent and the historical intents when the first action is compatible to the second action; and
responsive to determining that no conflict exists, merge the second edit to the second copy of the content with the first edit to the first copy of the content, wherein the merging includes performing the first action on the first field to replace a value of the first field with a first modified value and performing the second action on the first field to replace the first modified value of the first field with a second modified value.

12. The system of claim 11, wherein the conflict detection engine is further operable to associate a version identifier with each copy of the content as a baseline version when the copy is sourced.

13. The system of claim 12, wherein the conflict detection engine is further operable to accept the first edit when a comparison of a current version identifier and the baseline version identifier indicates that the content has not changed since the first copy was sourced.

14. The system of claim 12, further comprising a history storage for storing historical versions of records corresponding to changes to the content.

15. The system of claim 14, wherein the conflict detection engine is further operable to retrieve the historical versions of records when a comparison of a current version identifier of the content and the baseline version identifier of the first copy indicates that the content has changed since the first copy was sourced.

16. The system of claim 14, wherein the conflict detection engine is further operable to trim, from the history storage, the historical versions of records associated with any version identifier of the content prior to an oldest baseline version identifier associated with any currently sourced copy of the document.

17. The system of claim 11, wherein the conflict detection engine is further operable to determine the first intent of the first edit based on a difference between structured data in the first copy and structured data in a different version of the content.

18. A non-transitory computer readable medium containing computer executable instructions which, when executed by a computer, perform operations for detecting conflicting edits to structured data, the operations comprising:
- receiving a first edit to structured data associated with a source version of content, the first edit expressed as a first intent indicating a first action to be performed at a first field of the structured data, wherein the first intent includes a verb and a slot, the verb corresponding to the first action and the slot containing a value corresponding to the first edit;
- receiving a second edit to structured data associated with the source version of content, the second edit expressed as a second intent indicating a second action to be performed at the first field of the structured data;
- identifying historical versions of the content since the source version of content was sourced;
- automatically determining whether a conflict exists based on performing semantic analysis on intents of edits received in the source version and historical intents of edits made in the historical versions, wherein performing the semantic analysis includes determining whether the first action of the first intent is compatible with the second action of the second intent, and comparing the first intent against the second intent and the historical intents when the first action is compatible to the second action; and
- responsive to determining that no conflict exists, merging the second edit with the first edit, wherein the merging includes performing the first action on the first field to replace a value of the first field with a first modified field and performing the second action on the first field to replace the first modified value of the first field with a second modified value.

* * * * *